(12) United States Patent
Oh et al.

(10) Patent No.: US 12,195,011 B2
(45) Date of Patent: Jan. 14, 2025

(54) METHOD FOR CONTROLLING DRIVING FORCE OF VEHICLE

(71) Applicants: Hyundai Motor Company, Seoul (KR); Kia Corporation, Seoul (KR)

(72) Inventors: Ji Won Oh, Whasung-Si (KR); Jeong Soo Eo, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 254 days.

(21) Appl. No.: 18/071,447

(22) Filed: Nov. 29, 2022

(65) Prior Publication Data
US 2023/0303087 A1 Sep. 28, 2023

(30) Foreign Application Priority Data

Mar. 23, 2022 (KR) ........................ 10-2022-0035720

(51) Int. Cl.
| | | |
|---|---|---|
| *B60W 40/11* | (2012.01) | |
| *B60W 10/22* | (2006.01) | |
| *B60W 50/00* | (2006.01) | |

(52) U.S. Cl.
CPC ............ *B60W 40/11* (2013.01); *B60W 10/22* (2013.01); *B60W 2050/0026* (2013.01); *B60W 2050/0052* (2013.01); *B60W 2520/26* (2013.01); *B60W 2530/10* (2013.01)

(58) Field of Classification Search
CPC .................. B60W 40/11; B60W 10/22; B60W 2050/0026; B60W 2050/0052; B60W 2520/26; B60W 2530/10; B60W 30/18172; B60W 2720/40; B60W 10/04; B60W 10/10; B60W 2510/22; B60W 2552/15; B60W 2720/30; B60W 10/08; B60W 10/119; B60W 40/076; B60W 40/10; B60W 40/13; B60W 2050/0022; B60G 17/0182; B60G 2800/014
See application file for complete search history.

(56) References Cited

U.S. PATENT DOCUMENTS

| | | | | |
|---|---|---|---|---|
| 5,444,621 | A | * 8/1995 | Matsunaga | ........ B60G 17/0165 280/5.518 |
| 11,787,410 | B1 | * 10/2023 | Oh | ........................ B60K 6/52 701/69 |
| 2012/0059544 | A1 | * 3/2012 | Kinoshita | ............. B60W 10/06 903/902 |

(Continued)

*Primary Examiner* — Sizo B Vilakazi
(74) *Attorney, Agent, or Firm* — Morgan, Lewis & Bockius LLP

(57) ABSTRACT

A method for controlling a driving force of a vehicle includes setting and providing a filter simulation map for simulating a filter to a control unit of the vehicle, determining a required driving force command based on vehicle driving information collected while the vehicle is driven, determining a final front wheel driving force command and a final rear wheel driving force command from the determined required driving force command through a limit application process of using a limit determined in accordance with a vehicle driving variable in the filter simulation map, and controlling a driving force which is applied to front wheels and rear wheels of the vehicle by a driving device configured to drive the vehicle in accordance with the determined final front wheel driving force command and the determined final rear wheel driving force command.

20 Claims, 20 Drawing Sheets

(56) References Cited

U.S. PATENT DOCUMENTS

2017/0326936 A1\* 11/2017 Saito .................. B60G 17/0161
2019/0023274 A1\* 1/2019 Liu ........................ B60W 40/11
2023/0303054 A1\* 9/2023 Oh ........................ B60W 50/00

\* cited by examiner

FIG. 5A
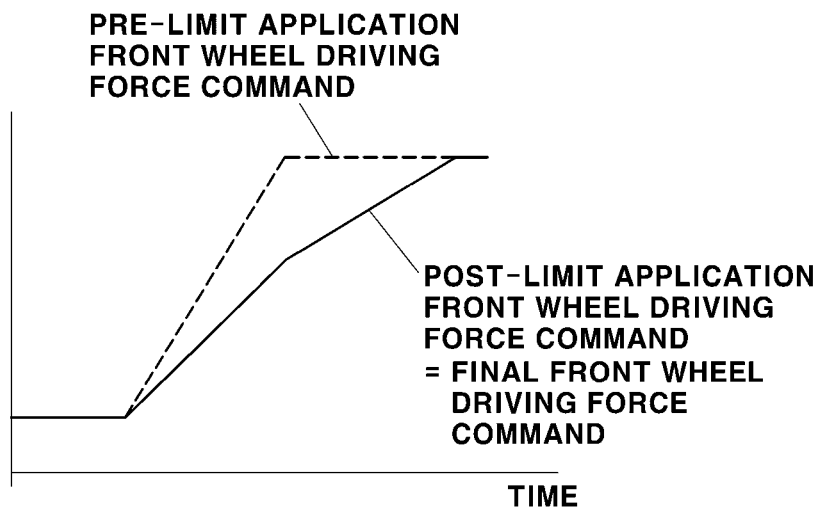
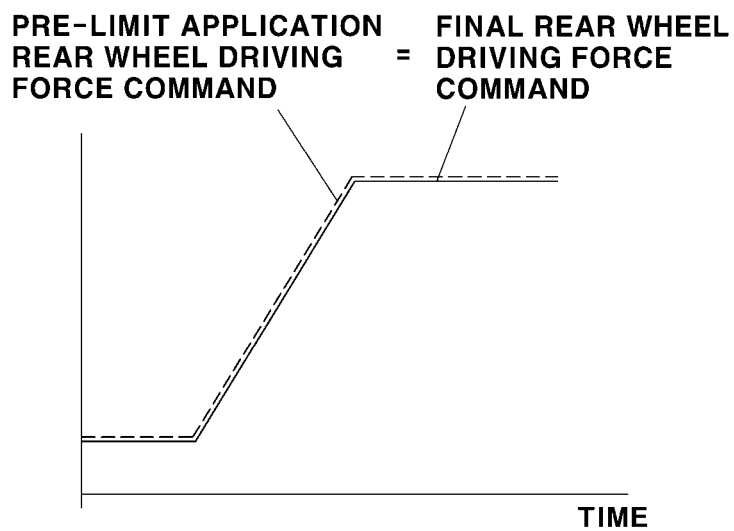

FIG. 12
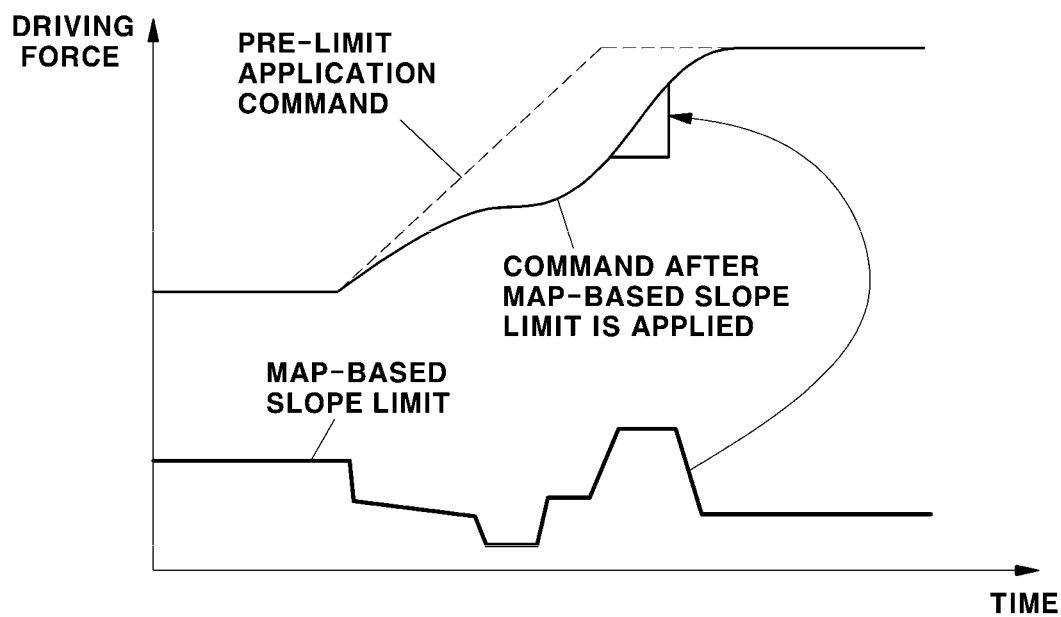
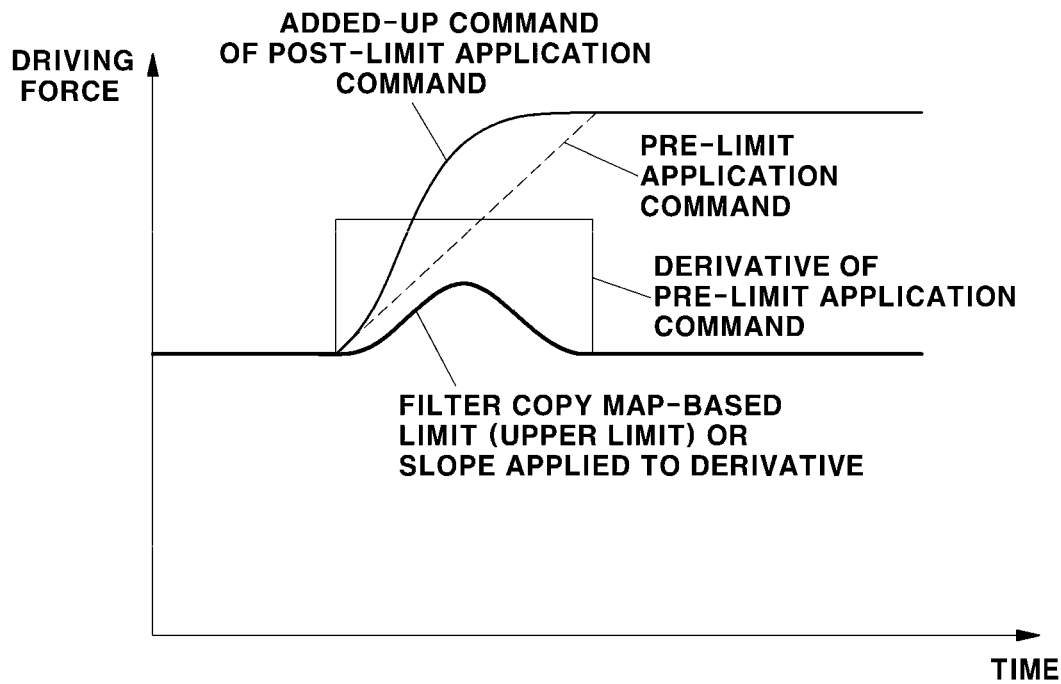

METHOD FOR CONTROLLING DRIVING FORCE OF VEHICLE

CROSS REFERENCE TO RELATED APPLICATION

The present application claims priority to Korean Patent Application No. 10-2022-0035720, filed Mar. 23, 2022, the entire contents of which is incorporated herein for all purposes by this reference.

BACKGROUND OF THE PRESENT DISCLOSURE

Field of the Present Disclosure

The present disclosure relates to a method for controlling a driving force of a vehicle, and more particularly, to a method that can solve the problem of repeated wheel slip and deterioration of wheel slip control performance due to longitudinal load movement by controlling the driving force of a vehicle by reflecting a pitch motion characteristic and longitudinal load movement information of the vehicle in real time.

DESCRIPTION OF RELATED ART

Recently, even though various electronic control units are used for vehicles, the motions of vehicles are limited finally due to the limitation of road surface friction. This is because motions of vehicles depend on the friction force with a road surface of tires. Accordingly, how effectively friction can be used is an important factor that determines motions of vehicles.

To effectively use friction force, it is important to control the driving force of wheels not to exceed the friction force that a road surface can provide. The friction force that a road surface can provide is generally influenced by the characteristics of the road surface, the amount of longitudinal/lateral slips of tires, a vertical load on tires, etc. The vertical load on tires of these factors may be considered as the factor that the mostly directly influences road surface friction force.

In general, it has been known that electronic control units such as an Anti-lock Braking System (ABS) and a Traction Control System (TCS) are used as a method of using friction force to limit a tire slip. However, the control types such as an ABS and a TCS have a defect that the slip control performance is not effective due to problems such as vehicle speed signal processing for preventing a control cycle delay or misoperation.

Recently, according to the trend of wheel slip control strategy in electric vehicles, many methods of using the torque and speed of a motor based on quick behavior of the motor rather than using a vehicle body reference speed and a wheel speed are being provided.

This strategy has an advantage that an absolute speed or a reference speed of a vehicle is not required, so that the strategy may be effective in an e-Four Wheel Drive (4WD) system. However, there may be limitation that a situation requiring driving force reduction control is repeated due to limitation of feedback control unless control that reflects first a suspension pitch motion (pitch motion) and vertical load information of tires which depends on the suspension pitch motion is not performed.

For example, when a front wheel driving force is generated, a pitch angle of a vehicle increases and a front wheel-vertical load decreases, whereby tire slip may occur at the front wheels. In the instant case, when a TCS operates and decreases the front wheel driving force, the tire slip amount of the front wheels decreases and the pitch angle of the vehicle decreases, whereby front wheel-vertical force may be secured back. However, when the front wheel-driving force increases again, the pitch angle increases again and the vertical load on the front wheels decreases again, so tire slip may occur again at the front wheels.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method that can solve the problem of repeated wheel slip and deterioration of wheel slip control performance due to longitudinal load movement by controlling the driving force of a vehicle by reflecting a pitch motion characteristic and longitudinal load movement information of the vehicle in real time.

The objectives of the present disclosure are not limited to those described above and other objectives not stated herein would be apparently understood by those who have ordinary skills in the art that the present disclosure belongs to (hereafter, 'those skilled in the art') from the following description.

To achieve the objectives, according to an exemplary embodiment of the present disclosure, there is provided a method of controlling a driving force of a vehicle. The method includes: setting and providing a filter simulation map for simulating a filter, which can remove or pass a frequency component corresponding to a natural frequency of a vehicle suspension pitch motion according to a suspension characteristic of the vehicle, to a control unit of the vehicle; determining, by the control unit, a required driving force command based on vehicle driving information collected while the vehicle is driven; determining, by the control unit, a final front wheel driving force command and a final rear wheel driving force command from the determined required driving force command through a limit application process of using a limit determined in accordance with a vehicle driving variable in the filter simulation map; and controlling, by the control unit, a driving force which is applied to front wheels and rear wheels of the vehicle by a driving device configured to drive the vehicle in accordance with the determined final front wheel driving force command and the determined final rear wheel driving force command, in which the filter simulation map is a map in which a limit is set in accordance with a vehicle driving variable, and the required driving force command or a value determined from the required driving force command is limited by the determined limit.

Therefore, according to the method of controlling a driving force of a vehicle, it is possible to effectively prevent wheel slip by only applying a software-related method without changing the hardware or increasing the manufacturing cost of a vehicle and it is possible to increase durability of tires through prevention of wheel slip. Furthermore, it is possible to achieve an effect of improving acceleration performance of a vehicle by maximally using suspension pitch motion limit traction and an effect of improving riding comfort by attenuating a suspension pitch motion.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5A, FIG. 5B, FIG. 5C, FIG. 5D, FIG. 5E, FIG. 5F, FIG. 5G and FIG. 5H are diagrams for describing several examples in which final front wheel driving force command and rear wheel driving force command are obtained using a map that copies a natural frequency removal filter in the present disclosure;

FIG. 12 is a diagram showing a driving force command in an exemplary embodiment that utilizes a map that copies a natural frequency removal filter and a map that copies a natural frequency pass filter.

Figure 1:
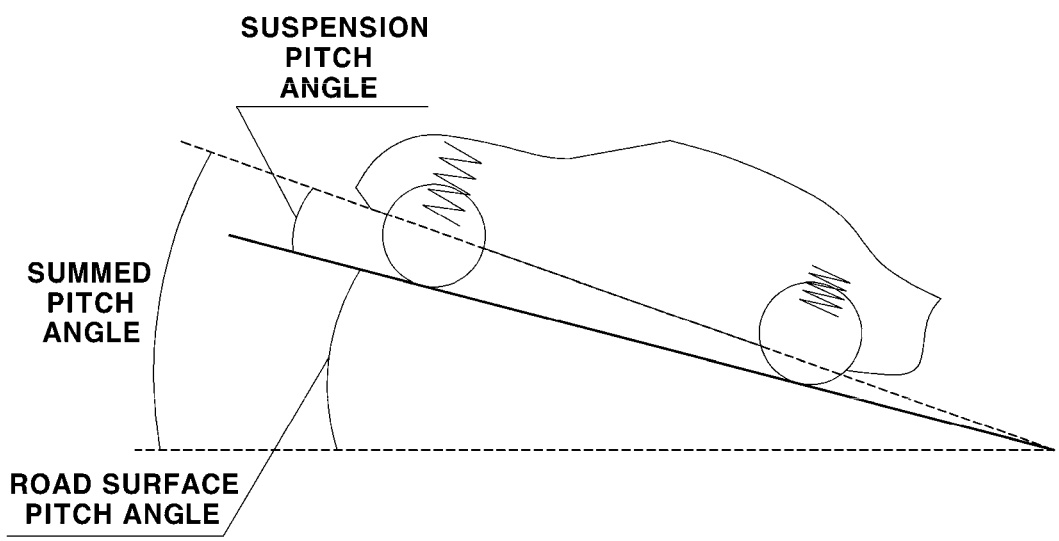
FIG. 1 is a diagram for describing a pitch angle of a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Embodiments of the present disclosure will be described hereafter in detail with reference to the accompanying drawings. Description of specific structures and functions included in embodiments of the present disclosure are only an example for describing the exemplary embodiments according to the concept of the present disclosure and the exemplary embodiments according to the concept of the present disclosure may be implemented in various ways. The present disclosure is not limited to the exemplary embodiments described herein and should be construed as including all changes, equivalents, and replacements that are included in the spirit and the range of the present disclosure.

It will be understood that, although the terms first and/or second, etc. may be used herein to describe various elements, but these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "comprising" used herein do not exclude that another component, step, operation, and/or element exist or are added in the stated component, step, operation, and/or element.

The present disclosure relates to a method for controlling a driving force of a vehicle, and that is, provides a method that can solve the problem of repeated wheel slip and deterioration of wheel slip control performance due to longitudinal load movement by controlling the driving force of a vehicle by reflecting a pitch motion characteristic and longitudinal load movement information of the vehicle in real time.

In the present disclosure, information of a transfer function (TF) that determines and outputs state information related to a pitch motion of a vehicle using a variable, which shows the driving state of the vehicle, as input is used to control a driving force which is applied to the driving wheels by a driving device of the vehicle. The driving wheels include the front wheels and the rear wheels of a vehicle.

In the present disclosure, a driving force is a force which is applied to driving wheels by a driving device that drives a vehicle, and may be considered as a force which is the sum of forces acting between a road surface and the tires of the driving wheels connected to the driving device to be able to transmit power.

The driving force may be considered as a force by torque which is applied to driving wheels by the driving device. In the instant case, a motor may be exemplified as the driving device. If the driving device that drives a vehicle is a motor, as in the instant case, torque which is applied to driving wheels is driving torque which is output by the motor. In the instant case, the driving force is a force for accelerating the vehicle rather than a force (regenerative braking force) decelerating the vehicle, and means a force by the torque which is output from the motor to accelerate the vehicle.

In the present disclosure, control of a driving force may be performed by controlling the operation and output of the driving device or controlling torque which is applied to driving wheels, and a 'driving force' and a 'driving force command' may be replaced with 'driving torque' and 'driving torque command' in the following description.

The fundamental concept of the method for controlling a driving force according to an exemplary embodiment of the present disclosure is to use state and characteristic information related to a pitch motion of a vehicle. The driving force control method for suppressing wheel slip in the related art is a feedback control method that corrects a driving force after wheel slip is generated. However, in the present disclosure, the magnitude of a driving force is adjusted to correspond to a pitch motion using state and characteristic information related to a pitch motion of a vehicle before wheel slip is generated.

A tire-vertical load and pitch angle of a vehicle may be exemplified as the state and characteristic information related to a pitch motion of a vehicle, and the vertical load of the information is a factor that the most directly determines the limit of traction between a road surface and a tire. The larger the tire-vertical load, the larger the available traction, so wheel slip is difficult to be generated. Furthermore, the smaller the tire-vertical load, the smaller the available traction, which is vulnerable to generation of wheel slip.

There are many reasons that change the tire-vertical load and it is difficult to control a driving force in consideration of all changes due to external disturbance. Accordingly, a change of the tire-vertical load due to at least driving force itself may be considered in driving force control except for changes due to external disturbance.

When a driving force is generated in a vehicle, pitch moment is generated due to the difference between the center of gravity and the center of pitch of the vehicle, and a pitch motion of the vehicle increases. In the instant case, a pitch angle is generated by the dynamic characteristics of a suspension and a vehicle body.

In general, a pitch angle increases when a vehicle is accelerated, and the vehicle state in the case is called a noseup motion or a squat state. The pitch angle decreases when a vehicle is decelerated, and this is called a nosedown motion or a dive state.

When a pitch motion of a vehicle is generated, the suspension of a vehicle contracts or extends, and accordingly, the spring or the damper of the suspension is deformed, which influences the tire-vertical load.

In the present disclosure, a pitch motion considers only a suspension pitch angle except for a road surface pitch angle, and the definition of the suspension pitch angle is shown in FIG. 1. FIG. 1 is a diagram for describing a pitch angle of a vehicle.

As shown in the figure, a pitch angle of a vehicle may be classified into a suspension pitch angle and a road surface pitch angle, and the sum of the suspension pitch angle (absolute value) and the road surface pitch angle (absolute value) may be defined as a total pitch angle.

A suspension angle when a front wheel suspension rebounds (extends) in comparison to a rear wheel suspension due to a stroke difference between the front wheel suspension and the rear wheel suspension and when the rear wheel suspension bumps (contracts) in comparison to the front wheel suspension may be defined as a positive (+) suspension pitch angle. The suspension pitch angle in the state of a vehicle exemplified in FIG. 1 is a positive value.

The road surface pitch angle corresponds to the longitudinal slope of a vehicle due to the slope of a road surface, and the suspension pitch angle is longitudinal slope of a vehicle due to extension or contraction of the front and rear wheel suspensions. A road surface pitch angle of common vehicles (a road gradient) may be detected through a longitudinal acceleration sensor.

Information related to a suspension pitch angle (suspension pitch angle information) of a vehicle shown in FIG. 1 is information showing a pitch direction vibration state of the vehicle due to a stroke change of the front wheel suspension and the rear wheel suspension while the vehicle is driven, and may be obtained through sensors on suspensions or may be estimated based on information collected through sensors, etc. In the vehicle.

A method of obtaining suspension pitch angle information through sensors on suspensions of a vehicle is a well-known technology in the art. For example, it is possible to determine suspension pitch angle information of a vehicle by comparing the positions of front wheels and rear wheel using a position sensor of a front wheel suspension and a position sensor of a rear wheel suspension based on signals from the positions sensors.

The method of estimating suspension pitch angle information is also well known in the art. That is, a method of obtaining a pitch angle by integrating a signal of a pitch rate sensor or kinematically estimating a pitch angle based on a longitudinal or vertical acceleration sensor value.

Furthermore, there are known a method of estimating a pitch angle through a suspension model-based observer, a method of determining a pitch angle through a wheel speed and driving force information model, a method of observing pitch angle information in a sensor fusion type by combining these method, etc.

A suspension pitch angle shows a positive (+) value direction in the vehicle state shown in FIG. 1, in which the vehicle may be considered as in a squat state based on the suspension pitch angle. If a suspension pitch angle shows a negative (−) value direction, opposite to FIG. 1, the vehicle may be considered in a dive state based on the suspension pitch angle.

Because the vehicle shown in FIG. 1 is in a state in which the vehicle body is inclined backward, it may be considered as a squat state based on the vehicle body. When a vehicle is in a squat state based on the vehicle body (a vehicle body squat state) may mean that the vehicle body is inclined backward with respect to the horizontal line (inclination angle 0°).

A state in which a vehicle body is inclined forward may be considered as a dive state based on the vehicle body, and a vehicle body dive sate may be considered as a state in which the vehicle body is inclined forward with respect to the horizontal line.

As described above, a squat state may be induced based on the suspension pitch angle in the vehicle state shown in FIG. 1 when the vehicle is accelerated, and a vehicle dive state may be induced based on the suspension pitch angle when the vehicle is decelerated.

A variation of a vehicle suspension pitch motion or longitudinal load movement of a vehicle due to a state variation of a suspension depends on characteristics determined by inherent suspension setting of a vehicle (suspension characteristics of a vehicle). The setting includes all of spring rigidity, a damping ability, bushing rigidity, the geometry of suspension arms, etc. of a suspension.

Suspension pitch motions of a vehicle such as dive (nosedown)/squat (noseup) due to these characteristics are generated while showing a feature determined by the setting, in which the feature means a motion having a specific natural frequency.

Accordingly, the principle of the present disclosure is to generate a driving force command that maximally does not increase a suspension pitch motion of longitudinal load movement of a vehicle by modeling a suspension pitch motion of longitudinal load movement of a vehicle which is determined by setting and characteristics of suspensions of a vehicle and by removing a frequency component corresponding to the natural frequency of the model from a driving force command using a filter simulation map, and to prevent wheel slip by controlling a driving force of a vehicle using the driving force command.

Alternatively, in contrast, an appropriate driving force is applied to the driving shaft of wheels at which traction is secured by load movement of front wheels and rear wheels by further increasing a frequency component corresponding to the natural frequency in a driving force command using a filter simulation map, securing acceleration performance within a range in which wheel slip may be suppressed.

Figure 2:
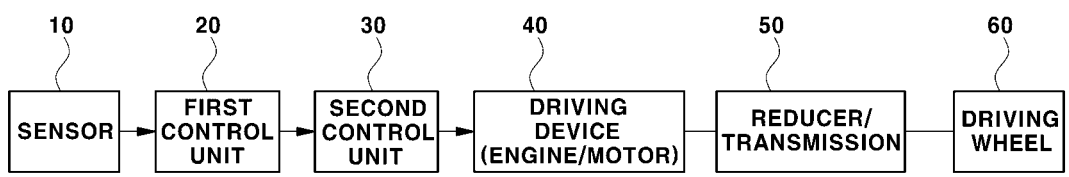
FIG. 2 is a block diagram showing a system configuration that performs a driving force control process according to an exemplary embodiment of the present disclosure.
Figure 3:
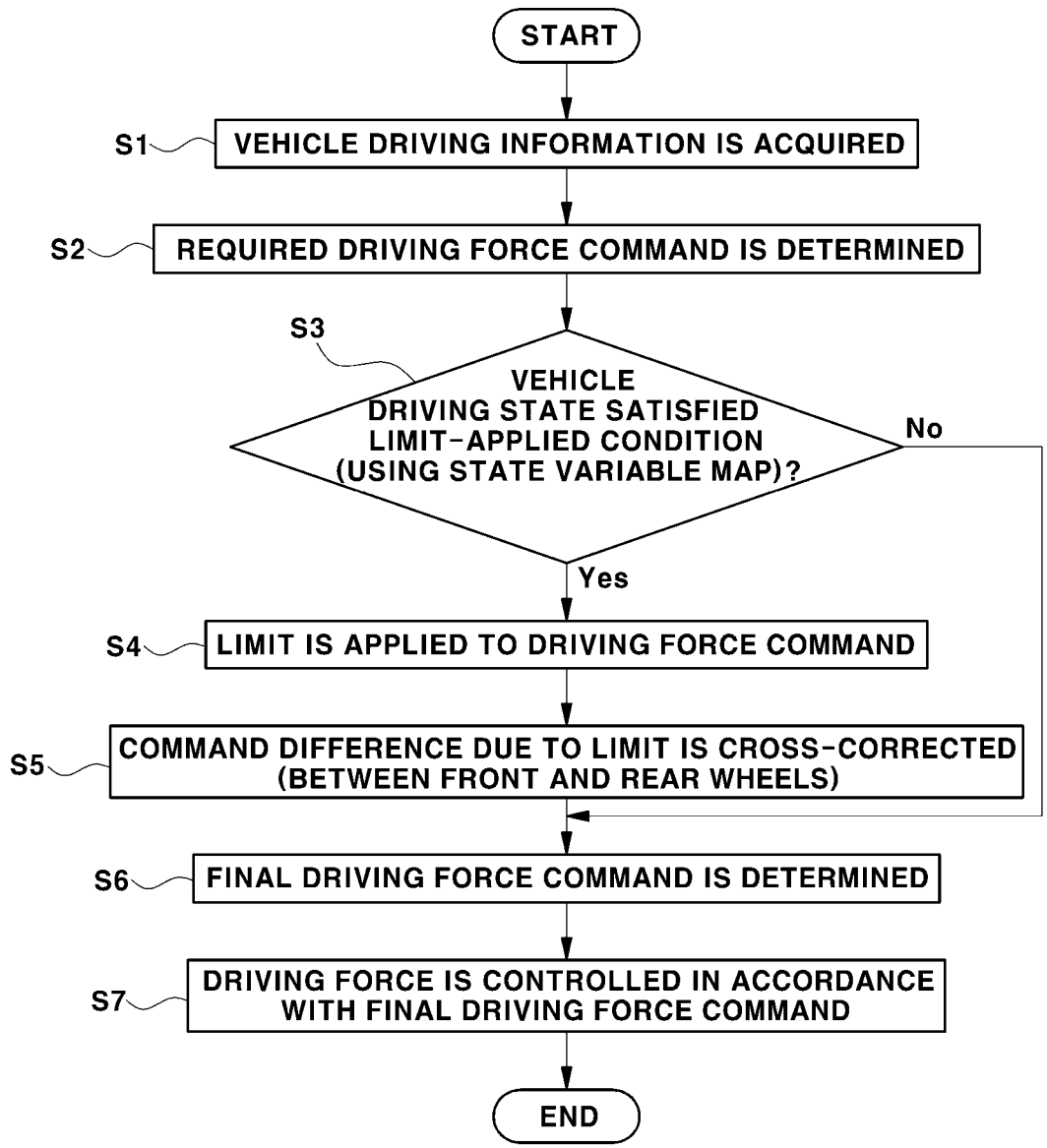
FIG. 3 is a flowchart showing a process of controlling a driving force of a vehicle according to an exemplary embodiment of the present disclosure.

Next, while the method for controlling a driving force is described in detail, and a system for controlling a driving force is also described. FIG. 2 is a block diagram showing a system configuration that performs a driving force control process according to an exemplary embodiment of the present disclosure and FIG. 3 is a flowchart showing a process of controlling a driving force of a vehicle according to an exemplary embodiment of the present disclosure.

Referring to FIG. 2, a system for controlling a driving force according to an exemplary embodiment of the present disclosure includes: a first control unit 20 that determines a required driving force command (required torque command) from vehicle driving information, and determines and outputs a front wheel driving force command and a rear wheel driving force command distributed in accordance with a front/rear wheel power distribution ratio from the required driving force command; a second control unit 30 that is configured to control a driving force to front wheels and rear wheels of the vehicle in accordance with the front wheel driving force command and the rear wheel driving force command; and a front wheel driving device and a rear wheel driving device that are driving devices 4o driving the vehicle and of which operation (driving force output) is controlled by the second control unit 20.

The front wheel driving force command is an command which is generated and output by the first control unit 20 to apply a driving force (driving torque) to front wheels and a front wheel shaft of driving wheels and driving shafts of a vehicle, and the rear wheel driving force command is an command which is generated and output by the first control unit 20 to apply a driving force to rear wheels and a rear wheel shaft. The front wheel driving force command and the rear wheel driving force command may be torque commands, and the value of each of the driving force commands is the value of torque which is distributed and applied to corresponding wheels and a corresponding driving shaft.

The front wheel driving force command and the rear wheel driving force command may be a torque command for the front wheel driving device and a torque command for the rear wheel driving device, respectively, and when a driving motor of a vehicle is a motor, the front wheel torque command and the rear wheel torque command are motor torque commands.

In the following description, the 'front wheel driving force command' may be replaced with a 'front wheel torque command', a 'front wheel shaft torque command', or a 'front wheel shaft driving force command'. Furthermore, the 'rear wheel driving force command' may be replaced with a 'rear wheel torque command', a 'rear wheel shaft torque command', or a 'rear wheel shaft driving force command'.

The method for controlling a driving force according to an exemplary embodiment of the present disclosure may be applied to a 4WD vehicle of which the front wheels and the rear wheels are driven by independent driving devices, respectively, and in detail, may be applied to a vehicle provided with an e-4WD system, that is, an e-4WD vehicle in which the front wheel driving device and the rear wheel driving device are both motors. Alternatively, the method may be applied also to a 4WD vehicle in which one of the front wheel driving device and the rear wheel driving device is an engine and the other one is a motor.

As for an e-4WD vehicle, for example, the first control unit 20 determines a required driving force command for driving the vehicle from vehicle driving information and distributes the required driving force command into a front wheel driving force command and a rear wheel driving force command in accordance with a predetermined front/rear wheel power transmission ratio.

The required driving force command may be a required driving force command which is determined and generated based on vehicle driving information collected in real time while a common vehicle is driven, and in the instant case, the first control unit 20 may be control unit that determines and generates a required torque command based on vehicle driving information collected in a common vehicle, that is, a Vehicle Control Unit (VCU) or a Hybrid Control Unit (HCU).

A method of determining and generating required driving force command in a common vehicle and the process thereof are well known generally, so they are not described in detail.

The first control unit 20 is provided with a filter simulation map in which a limit which is applied to a driving force command is set. The first control unit 20 corrects a driving force command by applying the limit determined in the filter simulation map to the driving force command, and generates and outputs a final driving force command (a final front wheel driving force command and a final rear wheel driving force command) that has undergone a correction processed based on the limit determined in the filter simulation map.

In more detail, the first control unit 20, as will be described below, performs correction that applies the limit determined by the filter simulation map to a required driving force command before distribution, or a distributed front wheel driving force command, a distributed rear wheel driving force command, or a derivative value of the command. The first control unit 20 can further correct a driving force command to which the limit has not been applied in consideration of the correction using the limit.

The first control unit 20 determines final front wheel driving force command and rear wheel driving force command through the correction process that includes applying the limit determined in the filter simulation map to a driving force command of a derivative value thereof, and outputs the determined final front wheel driving force command and rear wheel driving force command to the second control unit 30.

As described above, the final front wheel driving force command and the final rear wheel driving force command that are determined and output by the first control unit 20 are final driving force commands that have undergone a correction process of a filter simulation map to be described below. The correction process by a filter simulation map means a process of applying a limit using the limit determined by the filter simulation map. A process of applying a limit using a limit determined in a filter simulation map will be described in detail below.

In the present disclosure, the filter simulation map is a map for simulating a filter that can remove or pass the natural frequency component of a vehicle suspension pitch motion according to the suspension characteristic of a vehicle.

The filter simulation map may be a map in which a limit is set as a value according to a vehicle driving variable, and a required driving force command or a value determined from a required driving force command may be limited as the determined limit in a limit application process using the limit.

The value which is limited by a limit, that is, the value determined from the required driving force command may be one of a derivative value of the required driving force command, a front wheel driving force command and a rear wheel driving force command distributed from the required driving force command, a derivative value of the distributed front wheel driving force command, and a derivative value of the distributed rear wheel driving force command.

As described above, because a limit determined in a filter simulation map is applied to the command of the derivative value thereof, it is possible to provide an effect of removing or passing the natural frequency component of the vehicle suspension pitch motion from the required driving force command, or the front wheel driving force command, or the rear wheel driving force command.

In the present disclosure, the filter simulation map may be a map which is provided by determining a natural frequency of a vehicle suspension pitch motion according to a suspension characteristic of the vehicle, designing a filter that can remove or pass the natural frequency component of the vehicle suspension pitch motion from a driving force command using the driving force command as input thereof, and then defining the correlation between a limit for simulating the designed filter and the vehicle driving variable.

The limit which is determined in accordance with the vehicle driving variable in the filter simulation map may be at least one of an upper limit, a lower limit, and a rate limit.

The vehicle driving variable for determining the limit in the filter simulation map may be one of a value that is, as a value of a current control cycle, the required driving force command before limited by a limit, a value that is, as a value determined from the required driving force command of the current control cycle, a value before limited by a limit, a value that is, as a value of the immediately previous control cycle, the required driving force command after limited by a limit, and a value that is, as a value determined from the required driving force command of the immediately previous control cycle, a value after limited by a limit.

When a final front wheel driving force command (final front wheel torque command) and a final rear wheel driving force command (final rear wheel torque command) are determined and output by the first control unit 20, the second control unit 30 is configured to control a driving force (driving torque) which is applied to front wheels and rear wheels in accordance with the final front wheel driving force command final rear wheel driving force command.

In the instant case, the second control unit 30 can control the operation of the front wheel driving device and the rear wheel driving device which is the driving devices 40 of a vehicle in accordance with final driving force commands that are output from the first control unit 20. As a result, driving forces (driving torque and rotation force) that are output from the controlled driving devices 40, as shown in FIG. 2, are transmitted to front wheels and rear wheels that are driving wheels through a reducer (or a transmission) 50, whereby the vehicle may be driven.

The second control unit 30 may be a Motor Control Unit (MCU) that drives a motor, which is the driving device 40, through an inverter in accordance with a driving force command (driving torque command) in a common motor-driven vehicle, and that is configured to control driving of the motor.

The subject of control is divided as the first control unit and the second control unit in the above description, but the driving force control process according to an exemplary embodiment of the present disclosure may be one integrated control element instead of a plurality of control units.

A plurality of control units and one integrated control element may be referred to as a control unit and the driving force control process of the present disclosure to be described hereafter may be performed by the control unit. That is, the control unit may be a term including the first control unit and the second control unit.

The required driving force command (required driving torque command) which is determined by the first control unit 20 is determined and generated based on vehicle driving information collected in real time while a vehicle is driven, and the vehicle driving information may be information detected by a sensor 10 and then input to the first control unit 20 through a network of the vehicle.

The sensor 10 that detects vehicle driving information may include an Accelerator Position Sensor (APS) that detects an accelerator pedal input value by a driver, a sensor which is configured to detect a drive system speed, and a sensor configured for detecting a vehicle speed.

The drive system speed may be the rotation speed of the driving device 40 (a driving device speed), the rotation speed of driving wheels 60 (a wheel speed or a driving wheel speed), and the rotation speed of a driveshaft (a driveshaft speed).

The rotation speed of a driving device may be the rotation speed of a motor (a motor speed). The sensor that detects the drive system speed may be a sensor which is configured to detect a motor speed, which may be a resolver that detects the position of the rotor of a motor. Alternatively, the sensor which is configured to detect the drive system speed may be a wheel speed sensor which is configured to detect the rotation speed of driving wheels (a wheel speed) or a sensor which is configured to detect the rotation speed of a driveshaft.

The sensor which is configured to detect a vehicle speed may also be a wheel speed sensor. It is well known in the field of the art that vehicle speed information is obtained from a signal of the wheel speed sensor, so it is not described in detail.

As vehicle driving information which is detected by the sensor 10 for the first control unit 20 to determine a required driving force command, an accelerator pedal input value (APS value) by a driver, the speed (rotation speed) of a driving device, a vehicle speed, etc. may be selectively used. In the vehicle driving information, the accelerator pedal input value and may be driving input information by a driver, and the speed of the driving device 40 and the vehicle speed may be vehicle state information.

Alternatively, the vehicle driving information may be information which is determined by the first control unit 20 itself or may be information (e.g., required driving force information, required torque information) which is input to the first controller 20 through the vehicle network from another controller (e.g., an ADAS control unit) in the vehicle.

In an exemplary embodiment of the present disclosure, the sensor 10 may further include a sensor of a suspension for obtaining suspension pitch angle information. The sensor of a suspension for obtaining suspension pitch angle information may include a position sensor of a front wheel suspension and a position sensor of a rear wheel suspension.

As described above, a method of obtaining suspension pitch angle information through a sensor at a suspension of a vehicle is well known in the art. For example, it is possible to determine suspension pitch angle information of a vehicle in real time by comparing the positions of the front wheels and the rear wheels based on signals from the position sensors.

Furthermore, as described above, a suspension pitch angle, etc. may be obtained through a determined estimation process based on information collected from a vehicle through sensors, and the estimation method is well known to those skilled in the art, so it is not described in detail.

Meanwhile, a suspension pitch motion of a vehicle is generated in a noseup (squat) direction while the vehicle is accelerated, and in the instant case, the load on the vehicle moves rearward thereof. Accordingly, in comparison to when a load is in a neutral state (stop state), vertical load on the front wheel shaft decreases and wheel slip easily occurs, and the vertical load on the rear wheel shaft increases and wheel slip does not easily occur.

Accordingly, in the instant case, control of preventing wheel slip by removing the natural frequency component of a vehicle suspension pitch motion from a driving force command for the front wheels and the front wheel shaft may be performed. Furthermore, when the natural frequency component of a vehicle suspension pitch motion in a driving force command for the rear wheels and the rear wheel shaft is reinforced, wheel slip does not easily occur, so control of improving the acceleration performance by reinforcing the natural frequency component of the driving force command may be performed.

Considering the present respect, a map for simulating a filter (a natural frequency reinforcement filter) that removes or reinforces the natural frequency component of a vehicle suspension pitch motion in the driving force commands of a front wheel shaft and a rear wheel shaft, respectively, and a limit set in the map are used to achieve the above control, whereby the performance of preventing wheel slip and an acceleration performance are maximized.

In the instant case, it is possible to perform control of selectively applying a filter simulation map and a limit to both shafts to set drivability and driving performance or control of compensating for a torque difference between front and rear wheels, which is generated by the effect of applying a limit on one shaft, on the other shaft.

To remove or reinforce a frequency component, which increases a suspension pitch motion of a vehicle, in a driving force command using a filter simulation map, it is required first to find out the frequency characteristic of a suspension pitch motion of a vehicle to be controlled. This process may be performed by construction various types of transfer functions.

In the present disclosure, information of a transfer function having a variable showing a vehicle driving state as input and having state information related to a suspension pitch motion of a vehicle as an output is used to control a driving force. The information of a transfer function may be a natural frequency and the state information related to a suspension pitch motion which is the output of the transfer function may be suspension pitch angle information or tire-vertical load information.

The tire-vertical load information may include a front wheel-vertical load and a rear wheel-vertical load. In the following description, the 'front wheel-vertical load' may be replaced with a 'front wheel shaft-vertical load' or a 'front wheel axle-vertical load', and the 'rear wheel-vertical load' may be replaced with the 'rear wheel-vertical load' or a 'rear wheel shaft-vertical load'.

In the present disclosure, the suspension pitch angle (hereafter, abbreviated as a 'pitch angle') or the tire-vertical load (hereafter, abbreviated as a 'vertical load') may be determined using a transfer function, and an example of determining a pitch angle or a vertical load using a transfer function is described hereafter.

In the present disclosure, a transfer function is modeled and constructed to be configured to determine state information related to a suspension pitch motion of a vehicle by use of a variable, which shows a vehicle driving state, as input thereof, and the state information related to a suspension pitch motion of a vehicle may be a pitch angle or a vertical load.

Figure 4:
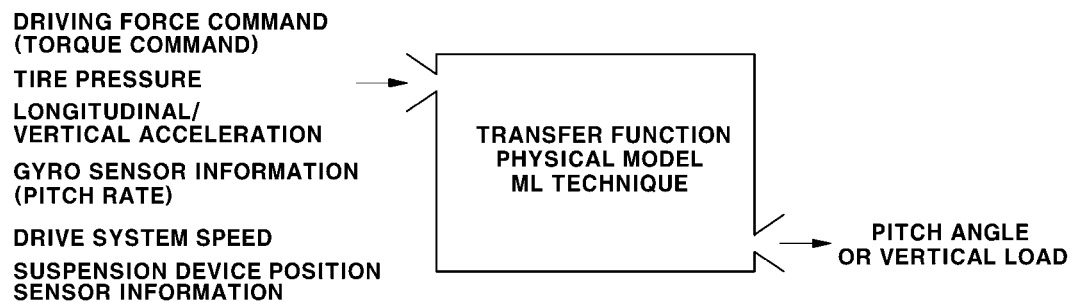
FIG. 4 is a diagram showing that a pitch angle or a vertical load may be determined using a transfer function in the present disclosure.

FIG. 4 is a diagram showing that a pitch angle or a vertical load may be determined using a transfer function that utilizes a variable, which shows a vehicle driving state, as input. In an exemplary embodiment of the present disclosure, a transfer function may have the following form.

First, a transfer function including driving force information as input and pitch angle information as output, or a transfer function including pitch angle information as input and vertical load information as an output may be constructed and used in a control unit (the first control unit 20). The driving force information may be a required driving force command (required driving torque command) which is determined by a control unit.

A required driving force command and a pitch angle which is input of the transfer function are variable information showing a vehicle driving state and may be obtained from information which is detected by the sensor 10. It was described above that a required driving force command is determined from sensor detection information and a pitch angle may be obtained from information detected by a suspension position sensor.

Alternatively, a transfer function including driving force information as input and including vertical load information as an output or a transfer function including tire pressure information detected by a tire pressure sensor as input and including vertical load information as an output may be constructed and used in a control unit.

Alternatively, a transfer function including longitudinal or vertical acceleration information which is detected by a longitudinal acceleration sensor or a vertical acceleration sensor provided in a vehicle as input and including pitch angle or vertical load information as an output may be constructed and used in a control unit.

Alternatively, a transfer function including a pitch angle change rate (a pitch rate) information obtained by a gyro sensor (a pitch rate sensor) as input and including pitch angle or vertical load information as an output may be constructed and used in a control unit.

Alternatively, a transfer function has a drive system speed as input and including pitch angle or vertical load information as an output may be constructed and used in a control unit. The drive system speed may be a wheel speed, or a driving device speed (a motor speed), or a driveshaft speed.

Alternatively, a transfer function including information detected by a suspension travel sensor as input and including pitch angle or vertical load information as an output may be constructed and used in a control unit.

Alternatively, a transfer function including two or more of the items of information described above as input and including pitch angle or vertical load information as an output may be constructed and used in a control unit.

The transfer function stated herein may be a transfer function set to determine a pitch angle or a vertical load using a data-based optimization technique, numerical solution, etc.

Alternatively, a physical model-based transfer function may be constructed and used and a learning technique for obtaining a transfer function may be used. Furthermore, algorithms including input and output described above may be constructed using various machine learning techniques other than a transfer function.

Meanwhile, when a transfer function is constructed in a control unit, that is, when a transfer function that can output pitch angle or vertical load information, which is state information related to a suspension pitch motion of a vehicle, using a variable showing a vehicle driving state as input is constructed in a control unit, the natural frequency of the transfer may be determined. The transfer function in the instant case may show an inherent characteristic of the vehicle to which the method for controlling a driving force of the present disclosure is applied.

In the present disclosure, the natural frequency of a transfer function constructed to output state information related to a suspension pitch motion of a vehicle using a variable, which shows a vehicle driving state, as input may be considered as the natural frequency of a suspension pitch motion vibration in a control target vehicle. It may be considered in the following description that the 'natural frequency of a transfer function' and the 'natural frequency of a vehicle suspension pitch motion' have the same meaning.

When the natural frequency of a vehicle suspension pitch motion, that is, the natural frequency of a transfer function constructed first is determined, a filter is configured and set based on the determined natural frequency information of the transfer function control a driving force of a vehicle.

In the instant case, a filter that can remove a frequency component, which corresponds to the natural frequency of the transfer function, from a driving force command may be configured and set. In an exemplary embodiment of the present disclosure, the filter may be a filter configured and set as a Laplace function.

As described above, suspension pitch information of a vehicle (state information related to a suspension pitch motion of a vehicle) such as pitch angle or vertical load information which is output of a transfer function constructed in a control unit of the vehicle to which the present disclosure is substantially applied may be used in various ways to control a vehicle. Furthermore, the natural frequency of the transfer function constructed in the control unit of the vehicle may be used to design and configure a filter, as in the present disclosure.

Furthermore, rather than that a natural frequency is determined with a transfer function constructed in a control unit of a vehicle to which the present disclosure is substantially applied, the transfer function described above is constructed through a previous evaluation and test process performed in the step of developing the same kind of vehicle and then the natural frequency of the transfer function may be obtained. Furthermore, a filter is designed using natural frequency information obtained in the instant way and a filter simulation map in which a limit is set as a value according to a vehicle driving variable to simulate the filter, so that the filter and the filter simulation map may be substantially used to control the driving force of mass-production vehicles.

An example of applying a limit using a limit determined in a filter simulation map is described in more detail hereafter.

In the following description, a 'driving force command' may mean one of a required driving force command which is determined based on vehicle driving information by the first control unit 20, a front wheel driving force command which is an command which is generated to apply a driving force distributed to front wheels based on the required driving force command, and a rear wheel driving force command which is an command which is generated to apply a driving force distributed to rear wheels based on the required driving force command. That is, the 'driving force command' may be understood as a meaning generally including all of a required driving force command, a front wheel driving force command, and a rear wheel driving force command.

In the following description, a 'front wheel driving force command' may be a torque command for front wheel and a front wheel shaft and may be a driving torque command of a front wheel driving device (e.g., a driving torque command of a front wheel motor). That is, it may be an command of a driving torque value which is applied to front wheels and a front wheel shaft by a front wheel driving device.

In the following description, a 'rear wheel driving force command' may be a torque command for rear wheel and a rear wheel shaft and may be a driving torque command of a rear wheel driving device (e.g., a driving torque command of a rear wheel motor). That is, it may be an command of a driving torque value which is applied to rear wheels and a rear wheel shaft by a rear wheel driving device.

FIG. 5A, FIG. 5B, FIG. 5C, FIG. 5D, FIG. 5E, FIG. 5F, FIG. 5G and FIG. 5H, which are views for describing an example in which final front wheel driving force command and rear wheel driving force command are obtained using a map simulating a filter that can remove the natural frequency component of a transfer function, show an exemplary embodiment using a filter simulation map that can remove the natural frequency component of a transfer function, that is, a filter simulation map that can remove the natural frequency component of a vehicle suspension pitch motion from a driving force command. The vertical axis shows a driving force and the horizontal axis shows time in FIG. 5A, FIG. 5B, FIG. 5C, FIG. 5D, FIG. 5E, FIG. 5F, FIG. 5G and FIG. 5H.

First, as shown in FIG. 5A, it is possible to apply a limit of a filter simulation map, which is configured to remove the natural frequency component of a transfer function (i.e., the natural frequency component of a vehicle suspension pitch motion) from a driving force command, only to a front wheel driving force command. The front wheel driving force command after the limit determined in the filter simulation map is applied (after the limit is applied) becomes a final front wheel driving force command, and the rear wheel driving force command to which the limit is not applied (before the limit is applied) becomes a final rear wheel driving force command.

Figure 5B:
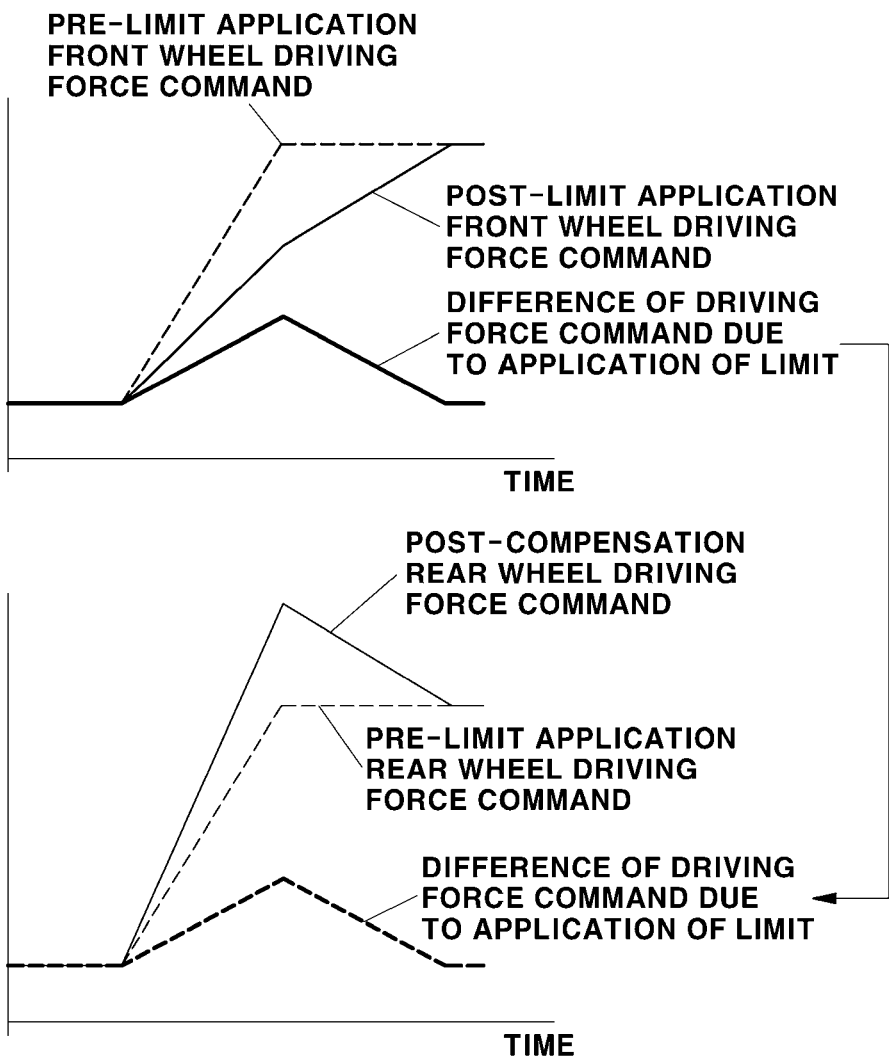

As an exemplary embodiment of the present disclosure, as shown in FIG. 5B, a limit determined in a filter simulation map is applied only to a front wheel driving force command, and it is possible to correct the rear wheel driving force command by compensating for the non-limit-applied rear driving force command by the difference between the pre-limit application front wheel driving force command and the post-limit application front wheel driving force command (i.e., the difference of driving force command due to a filter). In the instant case, compensation may be performed by adding the difference between the pre-limit application front wheel driving force command and the post-limit application front wheel driving force command to the rear wheel driving force command to which the limit is not applied.

As a result, the front wheel driving force command and the rear wheel driving force command are both compensated for by a filter simulation map and a limit determined in the filter simulation map. Furthermore, the front wheel driving force command is determined as a value to which the limit has been applied, and the rear wheel driving force command is determined as a value compensated for by the difference the front wheel driving force commands before and after the limit is applied.

In the example of FIG. 5B, the post-limit application front wheel driving force command becomes a final front wheel driving force command, and the post-compensation rear wheel driving force command becomes a final rear wheel driving force command. The post-limit application front wheel driving force command and the post-compensation rear wheel driving force command both may be considered as driving force commands corrected using the filter simulation map and the limit set in the filter simulation map.

Figure 5C:
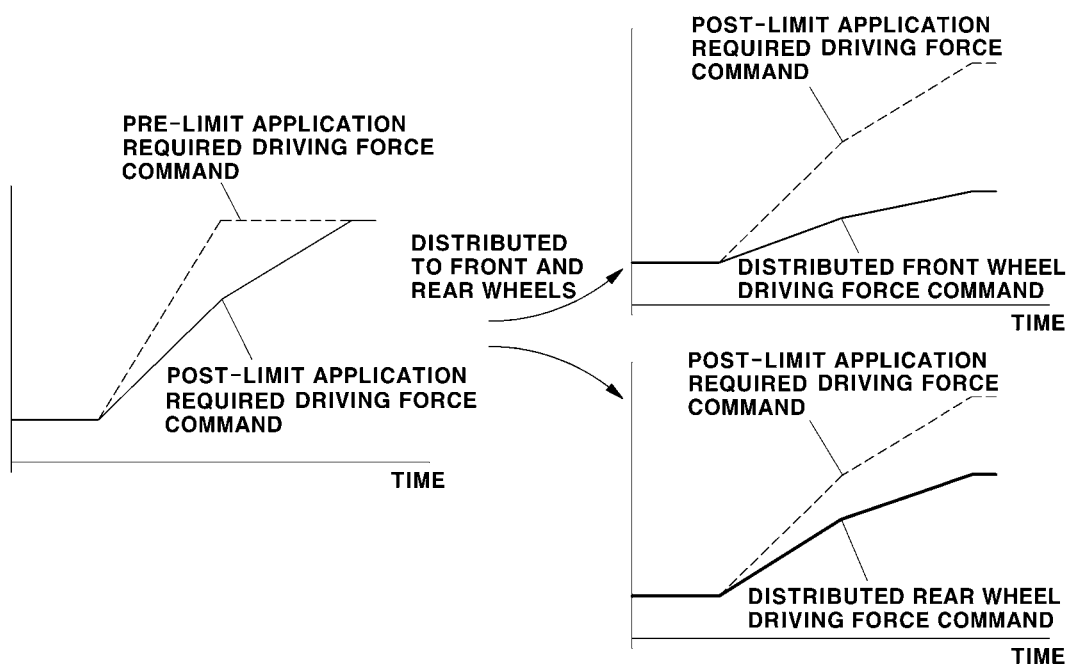

As an exemplary embodiment of the present disclosure, as shown in FIG. 5C, control is possible by applying a limit determined in a filter simulation map to a required driving force command which is a driving force command before distribution to front and rear wheels. In the instant case, the limit of the filter simulation map is applied to the required driving force command and the post-limit application required driving force command is distributed to front wheels and rear wheels in accordance with a front/rear wheel power distribution ratio (hereafter, a 'power distribution ratio') so that a front wheel driving force command and a rear wheel driving force command are determined.

The required driving force command, which is a common driving force command (driving torque command) which is determined based on vehicle driving information in a control unit, is a driving force command before power is distributed to front wheels and rear wheels and is a driving force command before a limit is applied.

As described above, a limit of a filter simulation map may be applied to a required driving force command. After a limit of a filter simulation map is applied to a required driving force command, the post-limit application required driving force command may be distributed in accordance with a power distribution ratio so that a final front wheel driving force command and a final rear wheel driving force command are determined.

Figure 5D:
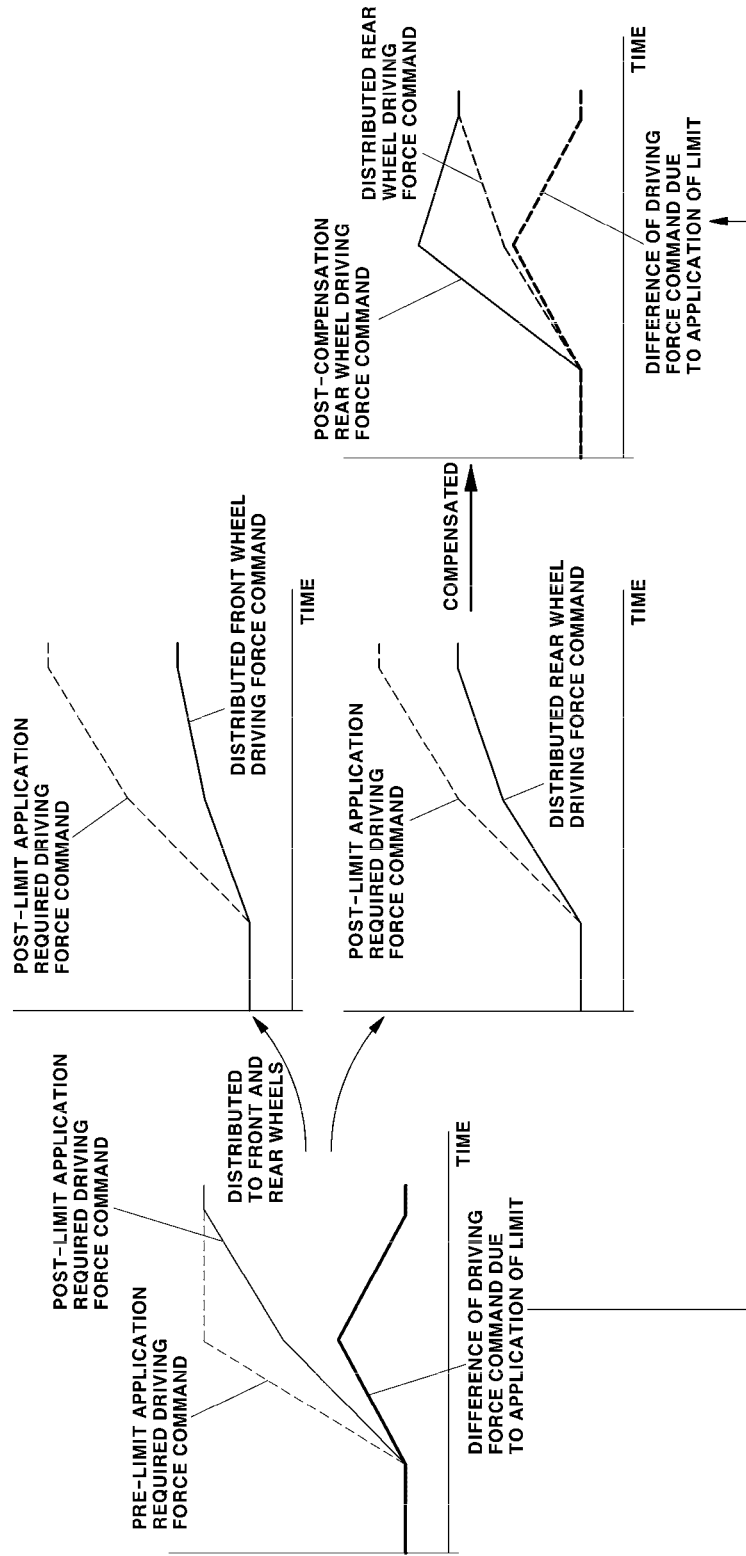
Figure 5E:
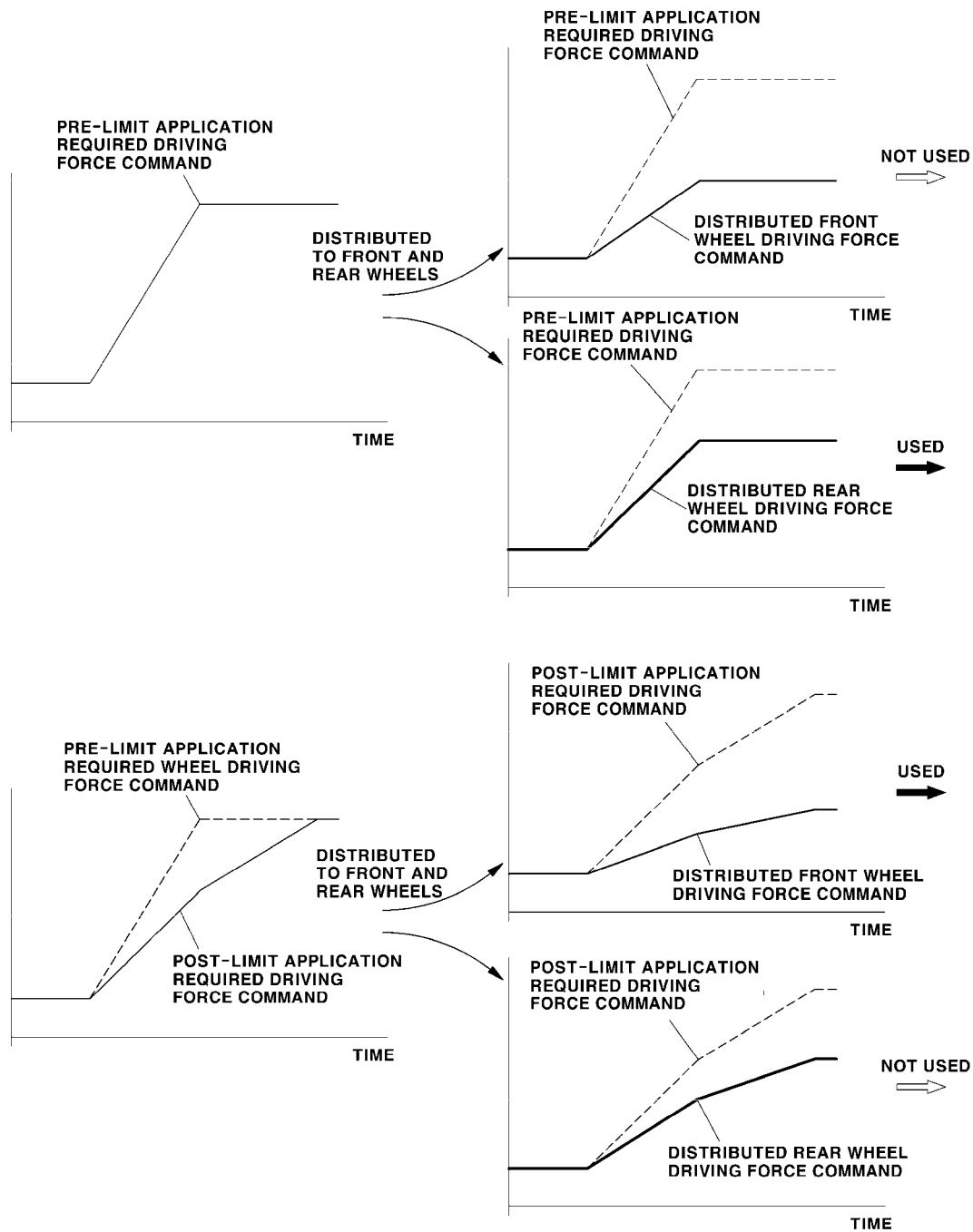

As an exemplary embodiment of the present disclosure, as shown in FIG. 5D, it is possible to correct the distributed rear wheel driving force command using the difference of driving force command due to application of a limit, that is, the difference between the pre-limit application required driving force command and the post-limit application required driving force command. The distributed rear wheel driving force command is a rear wheel driving force command distributed from the post-limit application required driving force command.

That is, it is possible to correct a rear wheel driving force command by compensating for the distributed rear wheel driving force command by the difference of the required driving force commands before and after the limit is applied, and it is possible to use the post-compensation rear wheel driving force command as a final rear wheel driving force command to control the driving force of the vehicle.

In the instant case, compensation may be performed by adding the difference of the required driving force commands before and after the limit is applied to the distributed rear wheel driving force command. Furthermore, a front wheel driving force command distributed from the post-limit application required driving force command is used as a final required driving force command.

As an exemplary embodiment of the present disclosure, as shown in FIG. 5D, after a limit determined in a filter simulation map is applied to a required driving force command, the pre-limit application required driving force command and the post-limit application required driving force command may be distributed in accordance with a power distribution ratio, and then a front wheel driving force command distributed from the post-limit application required driving force command and a rear wheel driving force command distributed from the pre-limit application required driving force command may be used as a final front wheel driving force command and a final rear wheel driving force command, respectively.

Figure 5F:
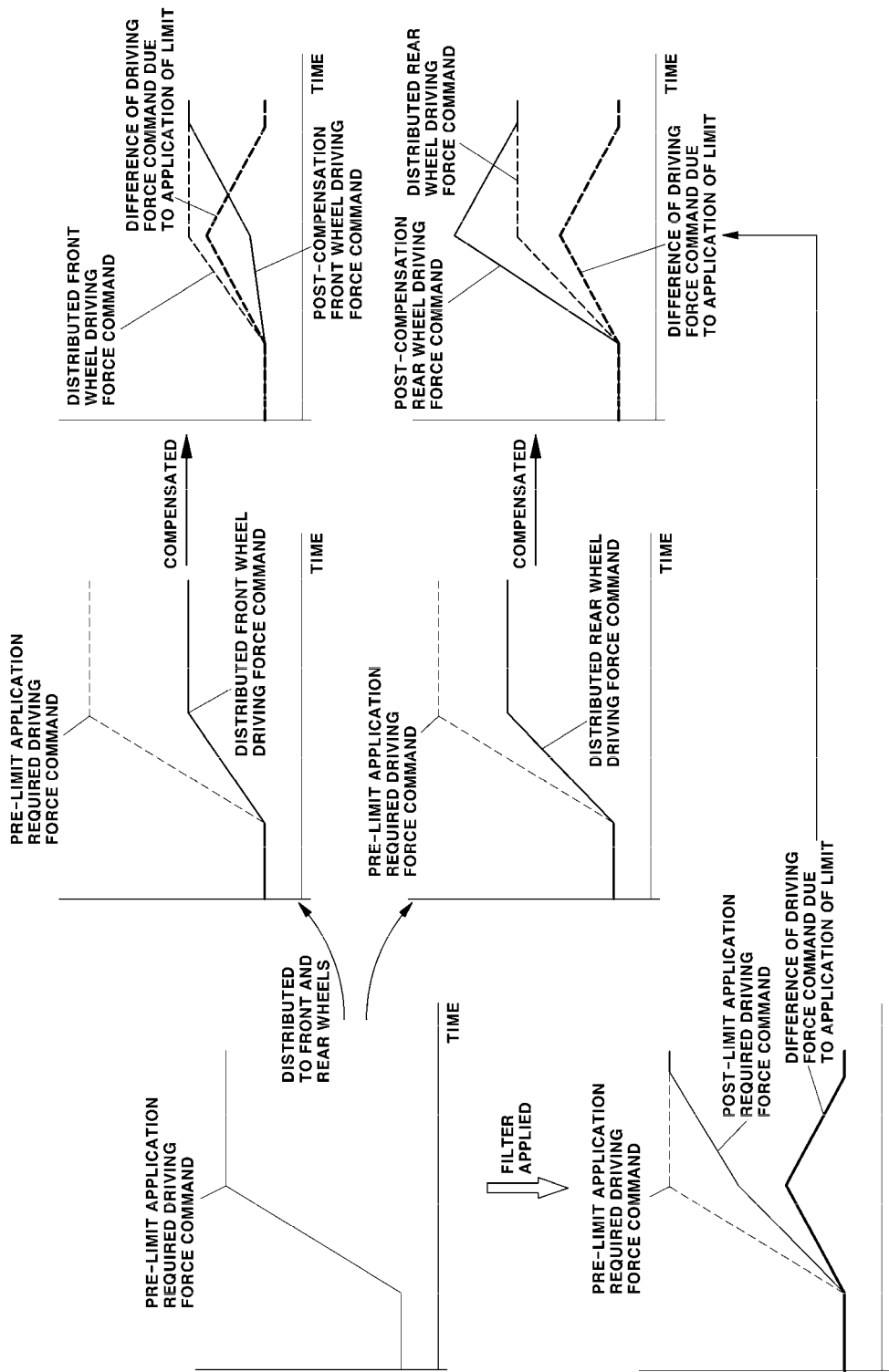

As an exemplary embodiment of the present disclosure, as shown in FIG. 5F, a front wheel driving force command and a the rear wheel driving force command distributed from a pre-limit application required driving force command are compensated for by the difference between the pre-limit application required driving force command and the post-limit application required driving force command (the difference of driving power command due to application of the limit), and then the post-compensation front wheel driving force command and the post-compensation rear wheel driving force command may be used to control a driving force of the vehicle.

In the instant case, it is possible to subtract the difference between the pre-limit application required driving force command and the post-limit application required driving force command (the difference of a driving force command due to application of the limit) from the front wheel driving force command distributed from the pre-limit application required driving force command, and then it is possible to use the post-subtraction (i.e., post-compensation) front wheel driving force command to control a driving force of the vehicle.

Furthermore, it is possible to add the difference between the pre-limit application required driving force command and the post-limit application required driving force command (the difference of a driving force command due to application of the limit) to the rear wheel driving force command distributed from the pre-limit application required driving force command, and then it is possible to use the added-up (i.e., post-compensation) rear wheel driving force command to control a driving force of the vehicle.

When performing correction of compensating for the driving force command by the difference between the pre-limit application command and the post-limit application command (the difference of a driving force command due to application of the limit), as in the example of FIG. 5F, it is possible to make the value of the corrected (post-compensation) driving force command not be smaller or greater than predetermined limits (an upper limit or a lower limit). That is, the value of the corrected (post-compensation) driving force command is limited not to be greater than an upper limit or not to be smaller than a lower limit.

When determining the difference of a driving force command due to application of the limit, the pre-limit application command may be the pre-limit application required driving force command (see the examples of FIGS. 5D and 5F) or the pre-limit application front wheel driving force command (see the example of FIG. 5B). Similarly, the post-limit application command may be the post-limit application required driving force command (see the examples of FIGS. 5D and 5F) or the post-limit application front wheel driving force command (see the example of FIG. 5B).

Furthermore, when limiting the value of the post-compensation driving force command compensated for by the difference, that is, the value of the corrected driving force command, it is possible to set and use the pre-limit application driving force command or the product of the pre-limit application driving force command and a scale value of 1 or more as the upper limit of the corrected driving force command. Furthermore, it is possible to set and use 0, or the pre-limit application driving force command, or the product of the pre-limit application driving force command and a scale value between 0 and 1 as the lower limit of the corrected driving force command.

The corrected driving force command may be the post-compensation front wheel driving force command and the post-compensation rear wheel driving force command compensated for by the difference of a driving force command due to application of the limit, and the pre-limit application driving force command which is used to set the upper limit and the lower limit may be the front wheel driving force command and the rear wheel driving force command distributed from the pre-limit application required driving force command.

Figure 5G:
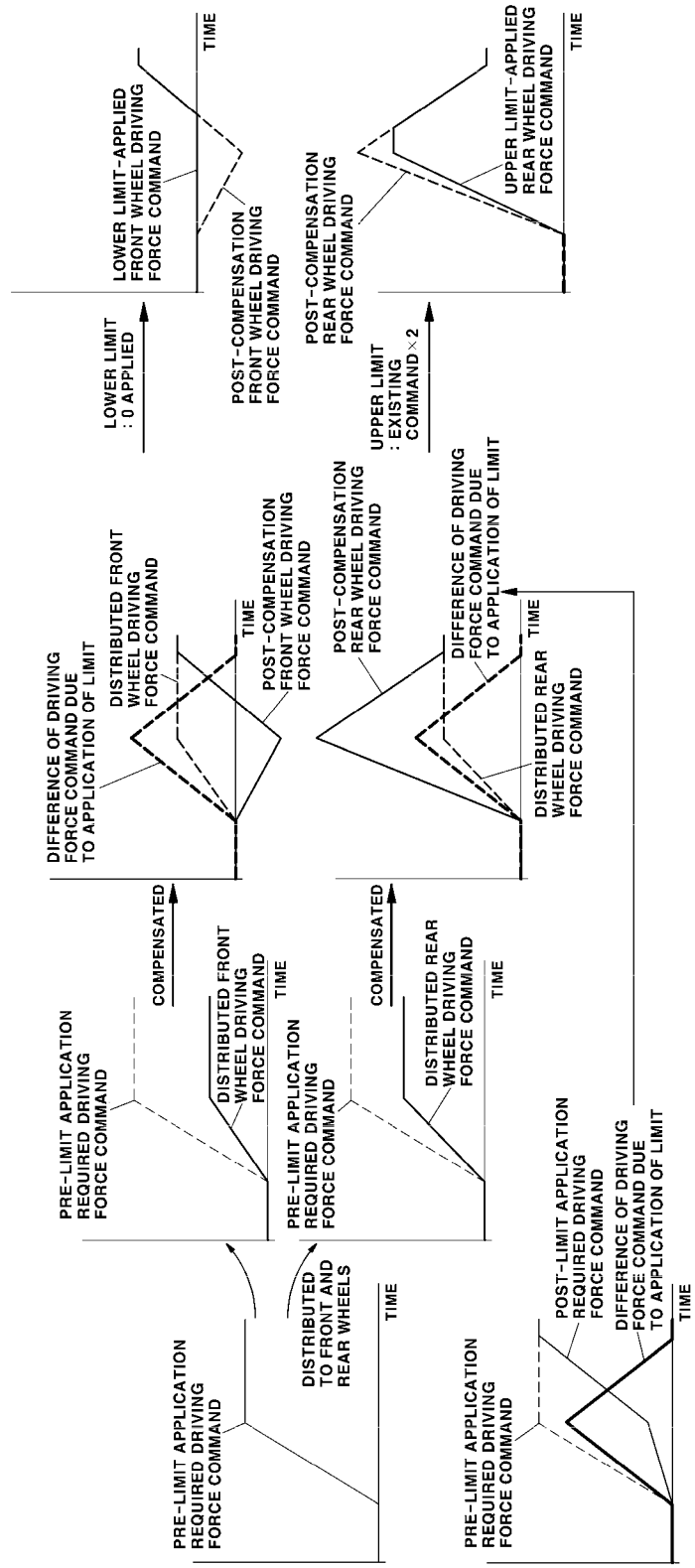

Referring to FIG. 5G, a lower limit is set as 0 and an upper limit is set as the product of a pre-limit application driving force command and a scale value (=2) of 1 or more. Furthermore, a lower limit is applied to a corrected (post-compensation) front wheel driving force command and an upper limit is applied to a corrected (post-compensation) rear wheel driving force command.

The pre-limit application driving force command which is used to set an upper limit may be a rear wheel driving force command distributed from the pre-limit application required driving force command. In the example of FIG. 5G, a lower limit of 0 is applied to the corrected (post-compensation) front wheel driving force command with 0 set as a lower limit in a control unit, and the lower limit-applied front wheel driving force command is used to control a driving force of the vehicle as a final front wheel driving force command.

Furthermore, in the example of FIG. 5G, the product of a rear wheel driving force command distributed from a pre-limit application required driving force command (i.e., the previous command) and a predetermined scale value of 2 is set as an upper limit, the upper limit is applied to the corrected (post-compensation) rear wheel driving force command with the upper limit set in a control unit in the present way, and the upper limit-applied rear wheel driving force command is used to control a driving force of the vehicle as a final rear wheel driving force command.

As described above, when limits for limiting a driving force command of wheels, that is, an upper limit and a lower limit are determined, it is possible to immediately use a rear wheel driving force command and front wheel driving force command that are determined by applying the upper limit and the lower limit to control a driving force of a vehicle. However, it may be possible to determine a modified driving force command (to which the upper limit or the lower limit has been applied) of wheels (front wheels or rear wheels), to which a limit (the upper limit or the lower limit) has been applied, by modifying the driving command of the wheels, and then use the modified driving force command of the wheels to control a driving force of the vehicle (see FIG. 5H).

The modified driving force command of the wheels may include a modified upper limit-applied rear wheel driving force command and a modified lower limit-applied front wheel driving force command.

In more detail, when the rear wheel driving force command and the front wheel driving force command to which the upper limit or the lower limit has been applied are determined, the difference between the rear wheel driving force command distributed from the required driving force command before the limit of a filter simulation map is applied and the rear wheel driving force command to which the upper limit or the lower limit has been applied is determined as a rear wheel correction amount.

For example, when an upper limit-applied rear wheel driving force command is determined by applying the upper limit to a corrected (post-compensation) rear wheel driving force command, the difference between the rear wheel driving force command distributed from the required driving force command before the limit of a filter simulation map is applied and the upper limit-applied rear wheel driving force command is determined and determined as a rear wheel correction amount.

Similarly, the difference between a front wheel driving force command distributed from the required driving force command before the limit of a filter simulation map is applied and a front wheel driving force command to which the upper limit or the lower limit has been applied is determined as a front wheel correction amount.

For example, when a lower limit-applied front wheel driving force command is determined by applying the lower limit to a corrected (post-compensation) front wheel driving force command, the difference between the front wheel driving force command distributed from the required driving force command before the limit of a filter simulation map is applied and the lower limit-applied front wheel driving force command is determined and determined as a front wheel correction amount.

When the rear wheel correction amount and the front wheel correction amount are determined, as described above, the absolute value of the determined rear wheel correction amount and the absolute value of the front wheel correction amount are compared with each other, and wheels at which the absolute value of a correction amount is small and wheels at which the absolute value of a correction amount is large are determined.

Next, the correction amount of the wheels at which the absolute value of a correction amount is small (i.e., a correction value of which the absolute value is relatively small) is determined and set as an upper limit of the correction amount of the wheels at which the absolute value of a correction amount is large. The product of the correction amount of the wheels at which the absolute value of a correction amount is small (i.e., the correction value of which the absolute value is relatively small) and −1 is determined and set as a lower limit of the correction amount of the wheels at which the absolute value of a correction amount is large.

Next, the correction amount of the wheels at which the absolute value of a correction amount is large is modified while being limited by the upper limit and the lower limit of the correction amount, the modified correction amount and the distributed driving force command of the wheels are added, and the sum is determined as a modified driving force command of the wheels, that is, a modified driving force command, to which an upper limit or a lower limit has been applied, of the wheels. The modified driving force command of the wheels determined in the instant way is used to control a driving force of the vehicle.

As for the wheels of which the absolute value of a correction amount is small, the corrected (post-compensation) driving force command obtained by the method described with reference to FIG. 5G may be intactly used to control a driving force of the vehicle.

In other words, first wheels at which the absolute value of a correction amount is small and second wheels at which the absolute value of a correction amount is large are determined from front wheels and rear wheels by comparing the absolute value of the front wheel correction amount and the absolute value of the rear wheel correction amount, and then the correction amount of the first wheels is determined as an upper limit of the correction amount of the second wheels and the product of the correction amount of the first wheels and −1 is determined as a lower limit of the correction amount of the second wheels.

Next, based on the correction amount of the second wheels which is limited by the determined upper limit of the correction amount of the second wheels and lower limit of the correction amount of the second wheels, the driving force command of the second wheels to which the upper limit or the lower limit of FIG. 5G is modified, and the modified driving force command of the second wheels is determined as a front wheel driving force command or a rear wheel driving force command for controlling a driving force.

In the example of FIG. 5G, a lower limit is applied to a corrected front wheel driving force command and the front wheel driving force command limited by the lower limit is used for controlling a driving force of a vehicle. Furthermore, an upper limit is applied to a corrected rear wheel driving force command and the rear wheel driving force command limited by the upper limit is used for controlling a driving force of a vehicle.

Figure 5H:
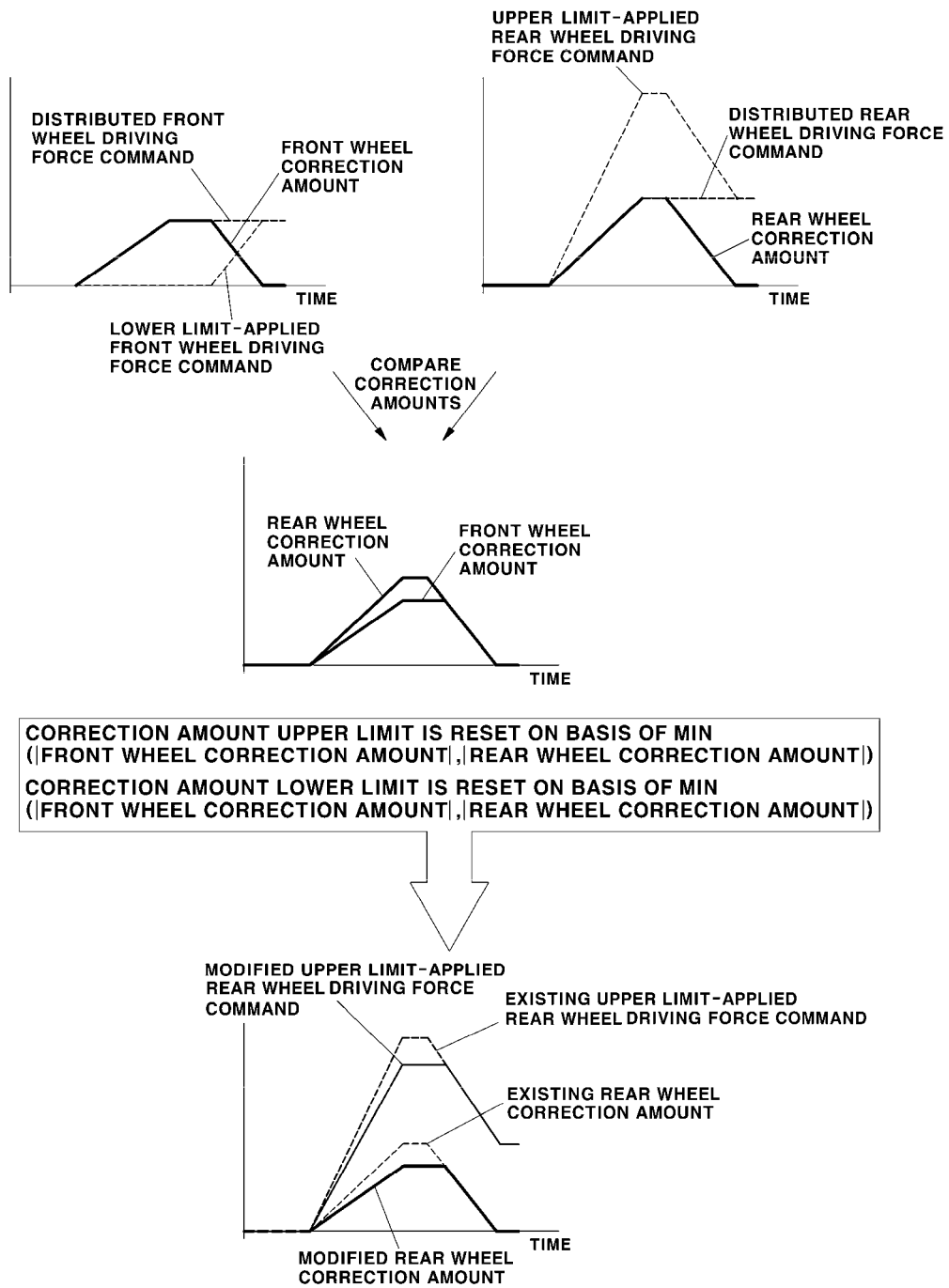

In the exemplary embodiment of FIG. 5H, the absolute value of the front wheel correction amount is smaller than the absolute value of the rear wheel correction amount, so that the front wheel correction amount is set as the upper limit of the rear wheel correction amount. Accordingly, in the example of FIG. 5H, the front wheels are the first wheels and the rear wheels are the second wheels.

In the instant case, the product of the front wheel correction amount and −1 is set as the lower limit of the rear wheel correction amount. As a result, the rear wheel correction amount is limited by the front wheel correction amount, and in the example shown in the figure, the rear wheel correction amount is always a value greater than the front wheel correction amount, so, in the instant case, the rear wheel correction amount is the same value as the front wheel correction amount.

Accordingly, a modified upper limit-applied rear wheel driving force command may be determined by applying the modified rear wheel correction amount. A rear wheel driving force command distributed from a required driving force command before the limit of a filter simulation map is applied is added to the modified rear wheel correction amount, and the sum is the modified upper limit-applied rear wheel driving force command.

Accordingly, the modified upper limit-applied rear wheel driving force command is used to control a rear wheel driving force as a final rear wheel driving force command when a driving force of a vehicle is controlled, and in the instant case, the front wheel driving force is the front wheel driving force command determined in the example of FIG. 5G, that is, a lower limit-applied front wheel driving force command.

A control unit can determine whether to apply the limit of the filter simulation map based on real-time vehicle driving information. Furthermore, when the control unit applies a limit determined in a filter simulation map to a driving force command, as described above, a weight determined based on the current vehicle driving information may be applied.

That is, it is required to apply the limit of a filter simulation map only to a specific area of a vehicle driving state to set vehicle drivability and whether the filter simulation map intervenes and the weight of application of the filter simulation map should be made different, depending on the vehicle driving state. Accordingly, a control unit (the first control unit 20) can determine whether to apply a filter simulation map, depending on a vehicle driving state, based on a preset state variable map, and a weight according to the vehicle driving state may be obtained and used by the state variable map.

In an exemplary embodiment of the present disclosure, the information showing a vehicle driving state for determining whether to apply a filter simulation map and a weight of application of the filter simulation map, that is, vehicle driving information may include at least one of driving torque, a drive system speed, a vehicle speed, and a driving input value by a driver.

The driving torque may be the current driving force command value or the driving force command value of the immediately previous control cycle. Alternatively, the driving torque may be a driving torque estimation value which may be generated when the current driving force command is applied or when the driving force command of the immediately previous control cycle is used.

The current driving force command or the driving force command of the immediately previous control cycle may be a pre-limit application required driving force command or a post-limit application required driving force command. The drive system speed, the vehicle speed, and the driving input value by a driver are sensor detection information which is detected by the sensor 10, and the driving input value by a driver may be an accelerator pedal input value (APS value) by a driver.

In a control unit (the first control unit 20), a weight may be determined by a state variable map, and not only a weight, but whether to apply a limit may be determined by one state variable map including vehicle driving information as input.

To the present end, a state variable map including vehicle driving information as input and including weight information and whether to apply a limit as an output may be input and stored in advance and used in the control unit. In the state variable map, a limit-applied region and a non-limit-applied region may be separately set based on a vehicle driving state, and a weight may be set as a value according to a vehicle driving state in the limit-applied region.

As an example of applying a limit, when a weight determined by a state variable map is α, the sum of the product of a post-limit application driving force command and α and the product of a pre-limit application driving force command and (1−α) may be determined as a final post-limit application command.

In more detail, a weight (α, 1−α) corresponding to the current vehicle driving state is determined from vehicle driving information using a state variable map, and a front wheel driving force command and a rear wheel driving force command are determined by distributing the required driving force command in accordance with a power distribution ratio.

Values obtained by applying the determined weight ($\alpha$, $1-\alpha$) to the front wheel driving force command distributed and determined without the limit application process and the front wheel driving force command obtained through the limit application process after distribution are added up.

Furthermore, values obtained by applying the determined weight ($\alpha$, $1-\alpha$) to the rear wheel driving force command distributed and determined without the limit application process and the rear wheel driving force command obtained through the limit application process after distribution are added up.

Next, the front wheel driving force command and the rear wheel driving force command obtained through adding-up are determined as the final front wheel driving force command and the final rear wheel driving force command, respectively.

Alternatively, as another example of application of a weight, it is possible to adjust a filter gain in accordance with a weight, and in the instant case, a filter gain multiplied by the weight may be used. The weight $\alpha$ may be set as 0 in a non-filter-applied region in the state variable map.

The driving force control process described above is summarized hereafter with reference to FIG. 3.

As shown in FIG. 3, vehicle driving information is obtained in real time while a vehicle is driven (step S1) and a control unit (the first control unit 20) determines a required driving force command based on the obtained vehicle driving information (step S2).

Next, the control unit (first control unit 2) determines whether the current vehicle driving state satisfies the limit in a state variable map, that is, whether it corresponds to the limit-applied region (step S3).

If determining that the current vehicle driving state is not the limit-applied region (weight $\alpha$=0), the control unit is configured to determine a final front wheel driving force command and a final rear wheel driving force command from a non-limit-applied required driving force command (step S6), and then is configured to control the driving force of a vehicle in accordance with the determined final front wheel driving force command and final rear wheel driving force command (step S7).

However, when determining that it is the limit-applied region, the control unit is configured to apply a limit determined in a filter simulation map to a driving force command (e.g., the front wheel driving force command) (step S4), and then determine the difference of the driving force command due to application of the limit and performs correction of compensating for a driving force command (rear wheel driving force command) by the difference (step S5). Next, the control unit is configured to determine that the determined front wheel driving force command and the rear wheel driving force command as a final front wheel driving force command and a final rear wheel driving force command, respectively (step S6).

Furthermore, the control unit is configured to control the driving force of the vehicle in accordance with the determined final front wheel driving force command and final rear wheel driving force command (step S7). When determining the final front wheel driving force command and the final rear wheel driving force command, it is possible to apply a weight determined by a state variable map, as described above.

Next, as another exemplary embodiment of the present disclosure, instead of a map simulating a filter configured to remove the natural frequency component of a transfer function (i.e., a natural frequency removal filter), a map simulating a filter configured to pass the natural frequency component of a transfer function may be set and used in a control unit.

Passing a natural frequency component means reinforcement of a natural frequency component in a driving force command. Accordingly, in the present disclosure, a filter that passes a natural frequency component (i.e., a natural frequency component-pass filter) and a filter simulation map may be a filter that reinforces a natural frequency component (i.e., a natural frequency component-reinforcing filter) and a filter simulation map.

FIG. 6A, FIG. 6B, FIG. 6C, FIG. 6D, FIG. 6E and FIG. 6F are views for describing several examples of obtaining final front wheel driving force command and rear wheel driving force command using a map simulating a filter that can pass the natural frequency component of a transfer function in the present disclosure, that is, showing an exemplary embodiment of using a map simulating a filter that ca reinforce the natural frequency component of a vehicle suspension pitch motion in a driving force command. The vertical axis shows a driving force and the horizontal axis shows time in FIG. 6A, FIG. 6B, FIG. 6C, FIG. 6D, FIG. 6E and FIG. 6F.

In an exemplary embodiment of using a filter simulation map for passing the natural frequency component of a transfer function, a method of applying a limit, which is determined in accordance with a vehicle driving variable in a filter simulation map, to a driving force command and then adding or subtracting the post-limit application driving force command to or from the pre-limit application driving force command may be used.

The limit which is determined in accordance with a vehicle driving variable in the filter simulation map may be, as described above, at least one of an upper limit, a lower limit, and a rate limit.

Figure 6A:
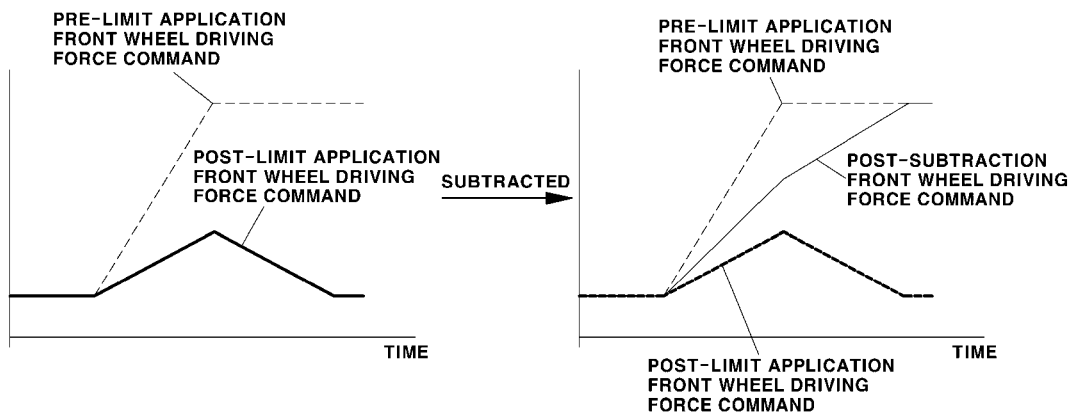
FIG. 6A, FIG. 6B, FIG. 6C, FIG. 6D, FIG. 6E and FIG. 6F are diagrams for describing several examples in which final front wheel driving force command and rear wheel driving force command are obtained using a map that copies a natural frequency reinforcement filter in the present disclosure.
Figure 6B:
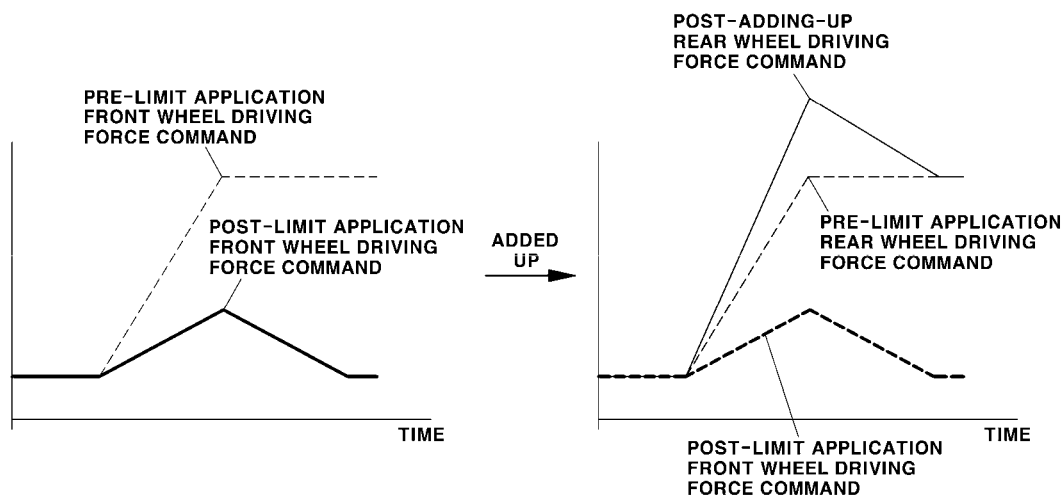

The exemplary embodiment of using a map simulating a natural frequency-pass (reinforcing) filter is described in more detail. First, a filter simulation map for passing the natural frequency component of a driving force command to be applied may be applied only to a front wheel driving force command distributed in accordance with a power distribution ratio, as shown in FIG. 6A and FIG. 6B.

That is, when a required driving force command is distributed in accordance with a power transmission ratio, and a front wheel driving force command and a rear wheel driving force command are determined, the limit of a filter simulation map is applied only to the front wheel driving force command of the distributed front wheel driving force command and rear wheel driving force command.

Next, the post-limit application front wheel driving force command is subtracted from the pre-limit application front wheel driving force command, and post-subtraction front wheel driving force command may be used to control a driving force of the vehicle as a final front wheel driving force command.

In the instant case, the rear wheel driving force command distributed in accordance with the power distribution ratio may be intactly used as a final rear wheel driving force command. That is, the rear wheel driving force command to which a limit is not applied after distribution may be intactly used to control a driving force of the vehicle.

Alternatively, as a required driving force command is distributed in accordance with a power distribution ratio, a front wheel driving force command and a rear wheel driving force command are determined, a limit is applied only to the front wheel driving force command of the distributed front wheel driving force command and rear wheel driving force command, and then as shown in FIG. 6B, the post-limit application front wheel driving force command is added to the non-limit-applied rear wheel driving force command.

In the instant case, the post-limit application front wheel driving force command may be used as a final front wheel driving force command, and a driving force command (i.e., a post-adding-up rear wheel driving force command) obtained by adding up the post-limit application front wheel driving force command and non-limit-applied (i.e., pre-limit application) rear wheel driving force command may be used to control a driving force of the vehicle as a final rear wheel driving force command.

Figure 6C:
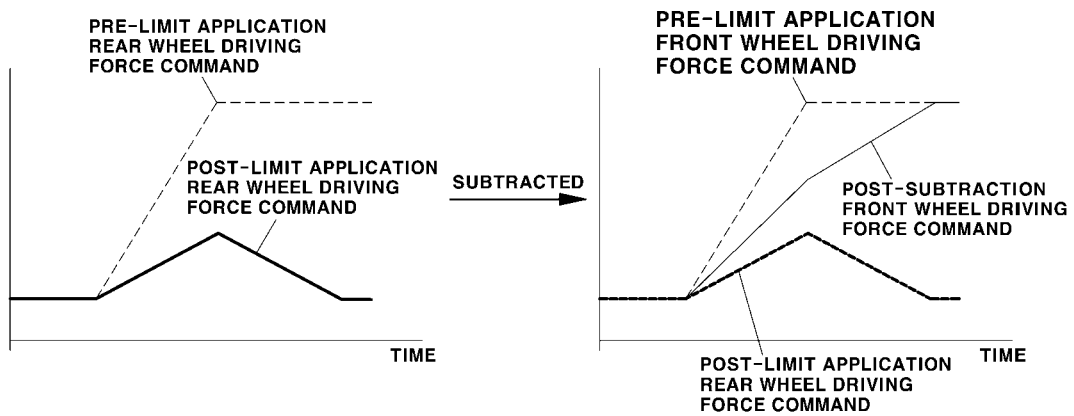
Figure 6D:
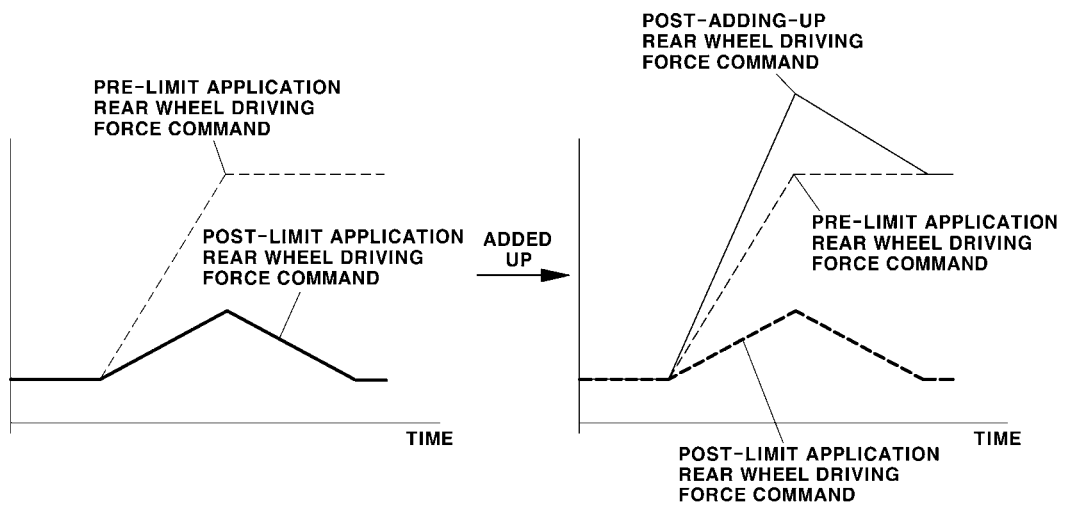

Alternatively, the limit of a map simulating a filter that passes a natural frequency component may be applied only to a rear wheel driving force command distributed in accordance with a power distribution ratio, as shown in FIGS. 6C and 6D.

That is, when a required driving force command is distributed in accordance with a power transmission ratio, and a front wheel driving force command and a rear wheel driving force command are determined, the limit of a filter simulation map is applied only to the rear wheel driving force command of the distributed front wheel driving force command and rear wheel driving force command.

Next, as shown in FIG. 6C, the post-limit application rear wheel driving force command is subtracted from the non-limit-applied (i.e., pre-limit application) front wheel driving force command, and the post-subtraction front wheel driving force command may be used to control a driving force of the vehicle as a final front wheel driving force command.

In the instant case, the post-limit application rear wheel driving force command may be used as the rear wheel driving force command. That is, the post-limit application rear wheel driving force command may be used to control a driving force of the vehicle.

Alternatively, as a required driving force command is distributed in accordance with a power distribution ratio, a front wheel driving force command and a rear wheel driving force command are determined, a limit is applied only to the rear wheel driving force command of the distributed front wheel driving force command and rear wheel driving force command, and then as shown in FIG. 6D, the post-limit application rear wheel driving force command is added to the pre-limit application rear wheel driving force command.

In the instant case, the non-limit-applied front wheel driving force command is used to control a driving force of the vehicle as a final front wheel driving force command, and a driving force command obtained by adding up the post-limit application rear wheel driving force command and the pre-limit application rear wheel driving force command (i.e., the post-adding-up rear wheel driving force command) may be used to control a driving force of the vehicle as a final rear wheel driving force command.

A map simulating a filter that passes a natural frequency component may be applied to the required driving force command.

In the instant case, the limit of a filter simulation map is applied to a required driving force command and the required driving force command obtained by applying the limit, that is, the post-limit application required driving force command is added to the pre-limit application required driving force command, and the sum may be determined as a required driving force command. Alternatively, the post-limit application required driving force command is subtracted from the pre-limit application required driving force command, whereby the subtracted value may be determined as a required driving force command.

It is possible to determine a front wheel driving force command and a rear wheel driving force command by distributing the determined required driving force command in accordance with a power distribution ratio, and it is possible to use the determined front wheel driving force command and rear wheel driving force command to control a driving force of the vehicle.

Figure 6E:
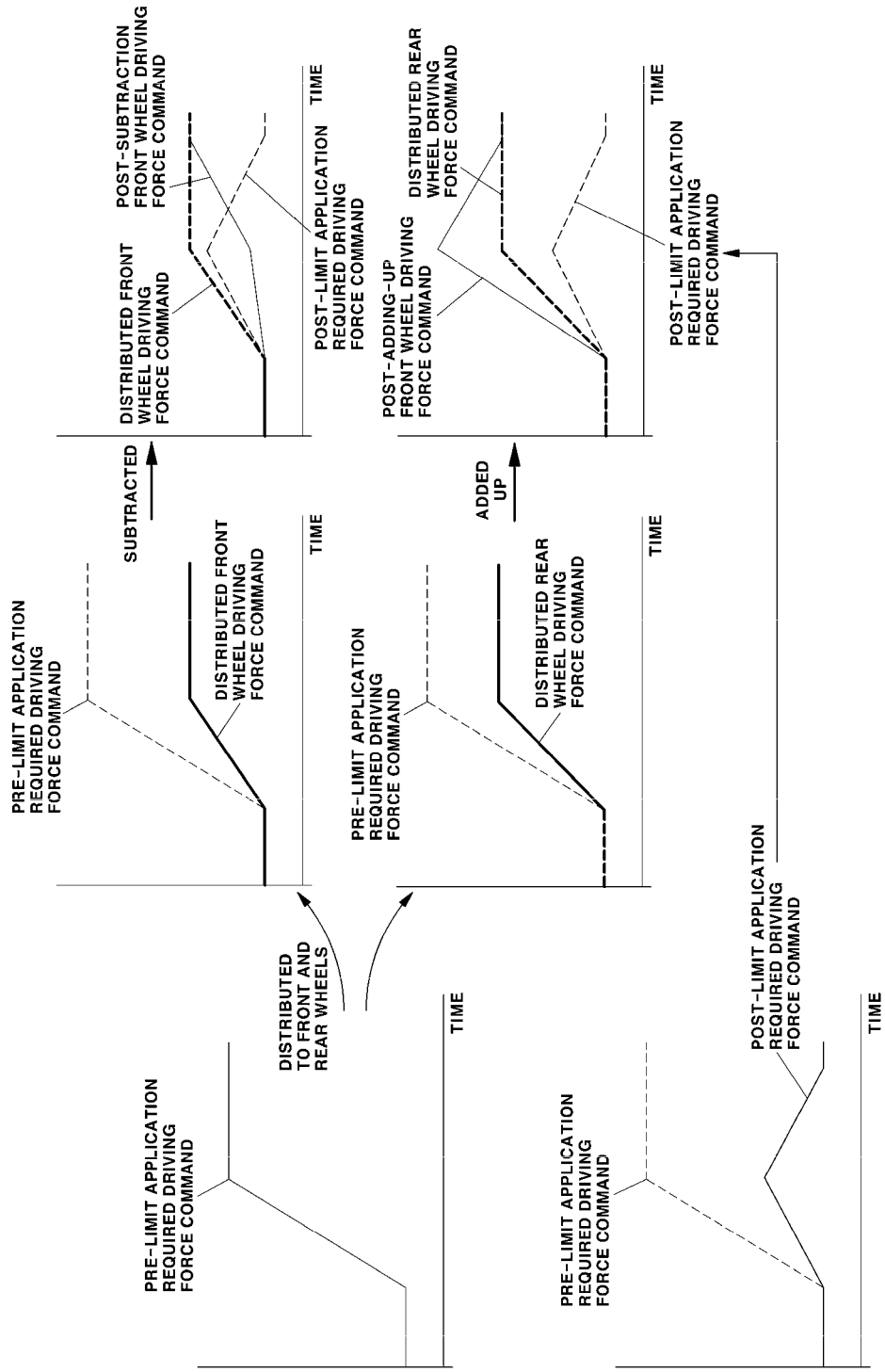

Alternatively, as shown in FIG. 6E, a limit is applied to a required driving force command and a non-limit-applied (i.e., pre-limit application) required driving force command is distributed in accordance with a power distribution ratio, determining a front wheel driving force command and a rear wheel driving force command.

Next, the post-limit application required driving force command is subtracted from the distributed front wheel driving force command and the post-subtraction front wheel driving force command is used to control a driving force of the vehicle as a final front wheel driving force command.

Similarly, the post-limit application required driving force command is added to the distributed rear wheel driving force command and the post-adding-up rear wheel driving force command is used to control a driving force of the vehicle as a final rear wheel driving force command.

Figure 6F:
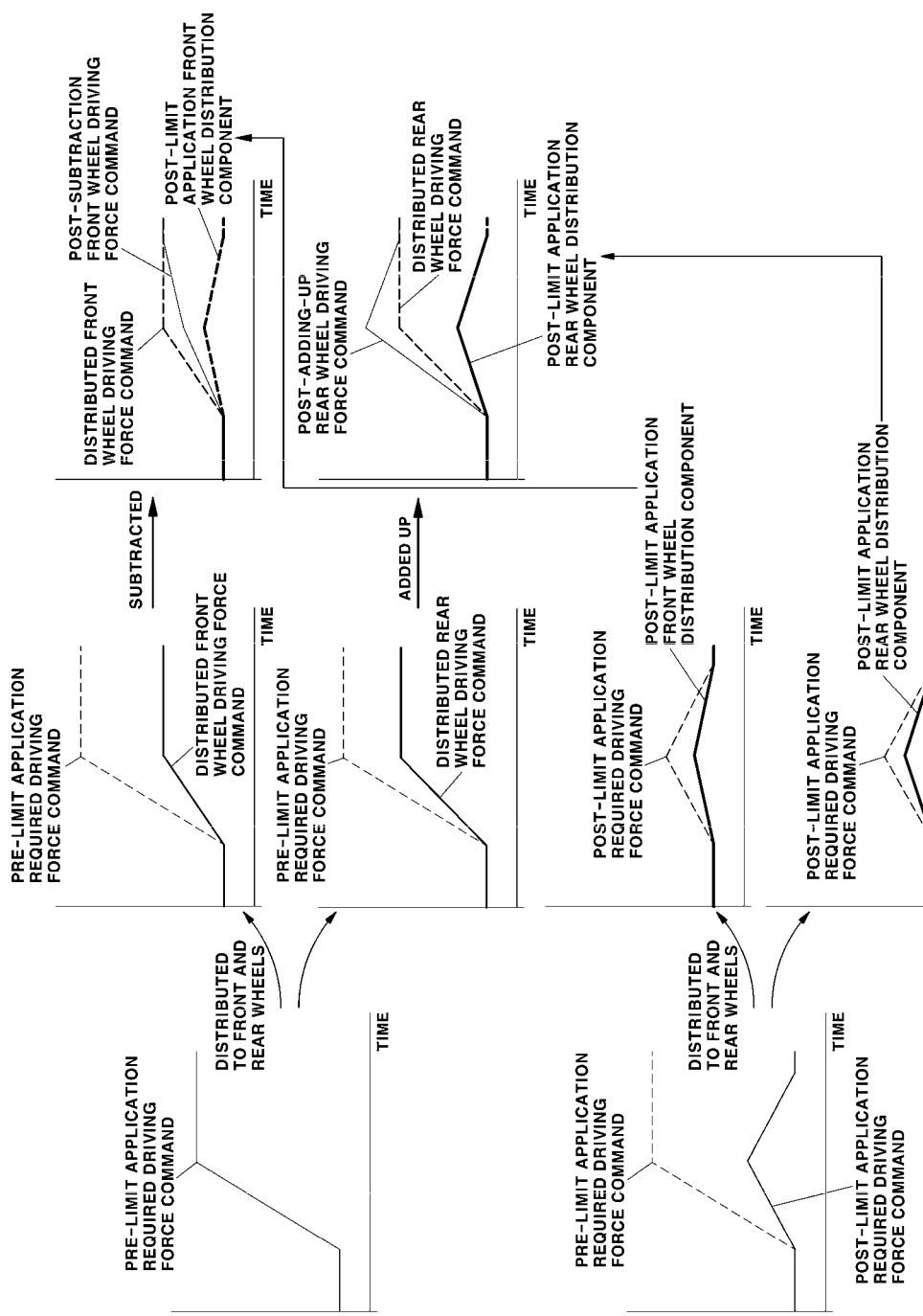

Alternatively, as shown in FIG. 6F, a limit is applied to a required driving force command and a non-limit-applied (i.e., pre-limit application) required driving force command is distributed in accordance with a power distribution ratio of front wheels and rear wheels, determining a front wheel driving force command and a rear wheel driving force command.

The limit-applied required driving force command, that is, the post-limit application required driving force command is distributed into a front wheel distribution component and a rear wheel distribution component in accordance with a power distribution ratio of front wheels and rear wheels. In the instant case, a post-filter application front wheel distribution component is a driving force command distributed to the front wheels from the post-limit application required driving force command, and the post-filter application rear wheel distribution component is the other driving force command distributed to the rear wheels from the post-limit application required driving force command.

Next, the post-filter application front wheel distribution component is subtracted from the front wheel driving force command distributed from the pre-limit application required driving force command, and the post-subtraction front wheel driving force command is used to control a driving force of the vehicles as a final front wheel driving force command.

Similarly, the post-filter application rear wheel distribution component is subtracted from the rear wheel driving force command distributed from the pre-limit application required driving force command, and the post-subtraction rear wheel driving force command is used to control a driving force of the vehicles as a final rear wheel driving force command.

When a map simulating a natural frequency-pass filter is applied, similar to when a map simulating a natural frequency removal filter is applied, it is possible to prevent the values of the post-subtraction front wheel driving force command and the post-adding-up rear wheel driving force command from becoming smaller or greater than preset limits (an upper limit and a lower limit). The value of the post-subtraction front wheel driving force command or the post-adding-up rear wheel driving force command is limited not to become greater than an upper limit of smaller than a lower limit.

When limiting the values of the post-subtraction front wheel driving force command and the post-adding-up rear wheel driving force command, it is possible to set and use a pre-limit application driving force command or the product of a pre-limit application driving force command and a scale value of 1 or more as the upper limit of the post-subtraction front wheel driving force command or the post-adding-up rear wheel driving force command.

Furthermore, it is possible to set and use 0, or a pre-limit application driving force command, or the product of a pre-limit application driving force command and a scale value between 0 and 1 as the lower limit of the post-subtraction front wheel driving force command or the post-adding-up rear wheel driving force command. The pre-limit application driving force command may be the front wheel driving force command and the rear wheel driving force command distributed from the pre-limit application required driving force command.

As a result, the final front wheel driving force command or rear wheel driving force command obtained in the examples of FIG. 6A, FIG. 6B, FIG. 6C, FIG. 6D, FIG. 6E and FIG. 6F, for example, the post-subtraction front wheel driving force command or the post-adding-up rear wheel driving force command in the example of FIG. 6F may be limited not to become greater than the upper limit or smaller than the lower limit, and a final front wheel driving force command or a final rear wheel driving force command may be determined as the limited value and used to control a driving force of the vehicle.

In the instant case, a lower limit may be applied to the post-subtraction front wheel driving force command and an upper limit may be applied to the post-adding-up rear wheel driving force command.

In addition to application of the upper limit and the lower limit, as described with reference to FIG. 5H, through an additional following process, it is possible to determine a driving force command of wheels to which a modified limit (the upper limit of the lower limit) has been applied, and then use the driving force command of the modified limit-applied wheels to control a driving force of the vehicle.

In the instant case, the driving force command of the modified limit-applied wheels may include a modified upper limit-applied rear wheel driving force command and a modified lower limit-applied front wheel driving force command.

In more detail, when the rear wheel driving force command and the front wheel driving force command to which the upper limit and the lower limit are applied are determined, the difference between the rear wheel driving force command distributed from the required driving force command before the limit of a filter simulation map is applied and the rear wheel driving force command to which the upper limit or the lower limit has been applied is determined as a rear wheel correction amount.

For example, when an upper limit-applied rear wheel driving force command is determined by applying the upper limit to the post-adding-up rear wheel driving force command, the difference between the rear wheel driving force command distributed from the required driving force command before the limit of a filter simulation map is applied and the upper limit-applied rear wheel driving force command is determined and determined as a rear wheel correction amount.

Similarly, the difference between the front wheel driving force command distributed from the pre-limit application required driving force command and a front wheel driving force command to which the limit has been applied is determined as a front wheel correction amount.

For example, when a front wheel driving force command to which the lower limit has been applied is determined by applying the lower limit to the post-subtraction front wheel driving force command, the difference between the front wheel driving force command distributed from the required driving force command before the limit of a filter simulation map is applied and the front wheel driving force command to which the lower limit has been applied is determined and determined as a front wheel correction amount.

When the rear wheel correction amount and the front wheel correction amount are determined, as described above, the absolute value of the determined rear wheel correction amount and the absolute value of the front wheel correction amount are compared with each other, and wheels at which the absolute value of a correction amount is small and wheels at which the absolute value of a correction amount is large are determined.

Next, the correction amount of the wheels at which the absolute value of a correction amount is small (i.e., a correction value of which the absolute value is relatively small) is determined and set as an upper limit of the correction amount of the wheels at which the absolute value of a correction amount is large. The product of the correction amount of the wheels at which the absolute value of a correction amount is small (i.e., the correction value of which the absolute value is relatively small) and −1 is determined and set as a lower limit of the correction amount of the wheels at which the absolute value of a correction amount is large.

Next, the correction amount of the wheels at which the absolute value of a correction amount is large is modified while being limited by the upper limit and the lower limit of the correction amount, the modified correction amount and the distributed driving force command of the wheels are added, and the sum is determined as a driving force command of the wheels to which an upper limit (or a lower limit) has been applied of the wheels. The determined driving force command of the wheels to which the modified upper limit (or lower limit) has been applied is used to control a driving force of the vehicle.

In the exemplary embodiment that utilizes a map simulating a filter that passes a natural frequency component, as described above, the method of using a weight may be applied in the same way as the exemplary embodiment that utilizes a map simulating a filter that removes a natural frequency component. Using a weight in the present exemplary embodiment of the present disclosure is not different from the exemplary embodiment that utilizes a simulating a filter that removes a natural frequency component, so this is not described.

Hereafter, the configuration of a filter that can remove a predetermined frequency component (a natural frequency component) of a pre-constructed transfer function is described in more detail.

As described above, a transfer function is constructed to be configured to determine state information related to a suspension pitch motion of a vehicle by use of a variable, which shows a vehicle driving state, as input thereof, and the state information related to a suspension pitch motion of a vehicle may be a pitch angle or a vertical load.

In the present disclosure, a frequency component which is a specific frequency component of a transfer function and may be removed through a filter may be the natural frequency component of a vehicle suspension pitch motion, and a driving force command including a frequency component corresponding to the natural frequency component of a vehicle suspension pitch motion increases the vehicle suspension pitch motion.

Accordingly, a removal target frequency that will be described through a filter may be determined as the natural frequency of the vehicle suspension pitch motion and may be used to construct a filter, and in the instant case, the natural frequency of the vehicle suspension pitch motion may be determined as the natural frequency of a transfer function including a pitch angle or a vertical load, which is state information related to the suspension pitch motion, as output, as described above.

In the present disclosure, a primary frequency at which a peck gain is generated when vehicle suspension pitch motion vibration is analyzed in a frequency domain (e.g., analyzed in a bode plot) may be determined as the natural frequency.

A driving force command including a frequency component corresponding to the natural frequency component increases a vehicle suspension pitch motion, whereby large longitudinal load movement occurs. Accordingly, there is a high possibility of a slip at wheels of which the traction decreased due to longitudinal load movement of front wheels and rear wheels. Accordingly, a natural frequency component may be removed from a driving force command to reduce wheel slip of a vehicle and attenuate a suspension pitch motion.

Accordingly, in the present disclosure, the information of a transfer function including state information of a suspension pitch motion of a vehicle as an output is used, and particular, a filter that can remove the natural frequency component of a transfer function using natural frequency information of the transfer function showing the natural frequency of the vehicle suspension pitch motion is configured. Furthermore, a map simulating the natural frequency removal filter is configured and then input and stored in a control unit (the first control unit 20) and used to correct a driving force command.

In the present disclosure, the natural frequency removal filter may be a low pass filter including a cut-off frequency corresponding to the natural frequency of a transfer function of a suspension pitch motion, a notch filter (band stop filter) including a center frequency corresponding to a natural frequency, etc.

In the instant case, a filter simulation map is configured so that a limit is set as a value according to a vehicle driving variable to be configured to simulate one of the filters described above. The filter simulation map may be configured by setting a limit according to a vehicle driving variable to show the same operation, function, and effect after the filter is configured as described above.

When the limit corresponding to a vehicle driving variable in the filter simulation map is applied to a driving force command, the same effect as when the filters described above are applied to driving force command may be provided.

That is, in the present disclosure, applying a limit set in accordance with a vehicle driving variable in a filter simulation map may mean obtaining almost the same operation and function as applying a filter to the driving force command and may mean that a filter simulation map and a filter provide substantially the same effect when they are applied to a driving force command.

In detail, when the limit of a map simulating a filter that can remove a natural frequency component is applied to a driving force command, the same effect as when a filter that can remove a natural frequency component is applied to the driving force command is shown, and in the instant case, it may be considered that the same function and operation are obtained when a filter simulation map and a filter are applied.

This is the same as in a filter that can pass a natural frequency component and a map simulating the filter. That is, when the limit of a map simulating a filter that can pass a natural frequency component is applied to a driving force command, the same effect as when a filter that can pass a natural frequency component is applied to the driving force command is shown, and in the instant case, it may be considered that the same function and operation are obtained when a filter simulation map and a filter are applied.

In the present disclosure, because a natural frequency removal filter is configured to remove a component, which corresponds to the natural frequency of the pre-constructed transfer function of a suspension pitch motion described above, from a driving force command, the cut-off frequency of a low pass filter or the center frequency of a notch filter may not accurately coincide with the natural frequency of a removal target.

However, considering the error range of a set natural frequency value, the natural frequency of a removal target may be higher than the cut-off frequency of a low pass filter and may exist in the stop band of a notch filter.

Furthermore, a multi-dimensional filter that can remove a component corresponding to a natural frequency may be used to configure a filter simulation map, other than a low pass filter or a notch filter. Furthermore, a filter may be designed using a transfer function itself constructed by modeling a real-time vertical load due to the suspension pitch motion of a vehicle or longitudinal load movement described above.

For example, it is assumed that a transfer function (TF) that derives a pitch angle (a squat angle φ) from a rear driving force command (torque command Tq) was constructed as in the following Equation 1.

$$TF = \frac{\phi}{Tq} = \frac{1}{c_1 s^2 + c_2 s + c_3} \quad \text{[Equation 1]}$$

In the instant case, it is possible to design and configure a filter based on a transfer function (TF) as in the following Equation 2, and it is possible to configure and provide a map simulating the filter to a control unit and use the map to control a driving force of a vehicle.

$$1 - c_4 sTF - c_5 TF = 1 - \frac{c_4 s}{c_1 s^2 + c_2 s + c_3} - \frac{c_5}{c_1 s^2 + c_2 s + c_3} = \quad \text{[Equation 2]}$$
$$\frac{1}{c_1 s^2 + c_2 s + c_3}(c_1 s^2 + c_2 s + c_3 - c_4 s - c_5) =$$
$$\frac{c_1 s^2 + (c_2 - c_4)s + (c_3 - c_5)}{c_1 s^2 + c_2 s + c_3}$$

where c1, c2, c3, c4, c5, etc. are coefficients which may be set (regardless of a positive value or a negative value), and s is a Laplace operator.

Next, the configuration of a filter that can pass a specific frequency component (a natural frequency component) of a pre-constructed transfer function is described in more detail.

In the present disclosure, a frequency component which is a specific frequency component of a transfer function and passes through a filter may be the natural frequency component of a vehicle suspension pitch motion, and as described above, a driving force command including a frequency component corresponding to the natural frequency component of a vehicle suspension pitch motion increases the vehicle suspension pitch motion.

Accordingly, large longitudinal load movement of a vehicle may also occur, and there is a high possibility of a slip at wheels of which the traction decreased due to longitudinal load movement of front wheels and rear wheels.

However, an environment in which a slip is difficult to occur is made for wheels of which the traction increased due to longitudinal load movement of the front wheels and the rear wheels of a vehicle. Accordingly, to secure excellent vehicle acceleration/deceleration performance, a component corresponding to the natural frequency of a suspension pitch motion may be reinforced in a driving force command to be configured to use load movement.

To reinforce a component corresponding to the natural frequency of a suspension pitch motion in a driving force command, as described above, a filter that can pass a component corresponding to the natural frequency may be configured and used.

In the present disclosure, the natural frequency pass filter may be a high pass filter including a cut-off frequency corresponding to the natural frequency of a transfer function of a suspension pitch motion, a band pass filter including a center frequency corresponding to a natural frequency, etc.

In the instant case, a filter simulation map that can simulate one of the filters described above may be configured. The filter simulation map is configured so that a limit is set as a value according to a vehicle driving variable to be configured to pass a natural frequency. The filter simulation map may be configured by setting a limit according to a vehicle driving variable to show the same operation, function, and effect after the filter is configured.

In the present disclosure, because a filter is provided to reinforce a component, which corresponds to the natural frequency of a pre-constructed transfer function of a suspension pitch motion described above, that is, the natural frequency of a transfer function outputting state information related to a suspension pitch motion of a vehicle, from a driving force command, the cut-off frequency of the high pass filter or the center frequency of the band pass filter may not accurately coincide with the natural frequency of a pass target.

However, the natural frequency of a pass target may be higher than the cut-off frequency of the high pass filter and may exist in the pass hand of the band pass filter.

Furthermore, a multi-dimensional filter that can pass a component corresponding to a natural frequency may be used to reinforce the component corresponding to a natural frequency other than the high pass filter or the band pass filter may be used. Furthermore, a filter may be designed using a transfer function itself constructed by modeling a real-time vertical load due to the suspension pitch motion of a vehicle or longitudinal load movement described above.

For example, it is assumed that a transfer function (TF) that derives a pitch angle (a squat angle φ) from a rear driving force command (torque command Tq) was constructed as in the following Equation 3.

$$TF = \frac{\phi}{Tq} = \frac{1}{c_1 s^2 + c_2 s + c_3} \quad \text{[Equation 3]}$$

In the instant case, it is possible to design and configure a filter based on a transfer function (TF) as in the following Equation 4, and it is possible to configure and provide a map simulating the filter to a control unit and use the map to control a driving force of a vehicle.

$$c_4 s TF + c_5 TF = \quad \text{[Equation 4]}$$
$$\frac{c_4 s}{c_1 s^2 + c_2 s + c_3} + \frac{c_5}{c_1 s^2 + c_2 s + c_3} = \frac{c_4 s + c_5}{c_1 s^2 + c_2 s + c_3}$$

where $c1$, $c2$, $c3$, $c4$, $c5$, etc. are coefficients which may be set (regardless of a positive value or a negative value), and $s$ is a Laplace operator.

Figure 7:
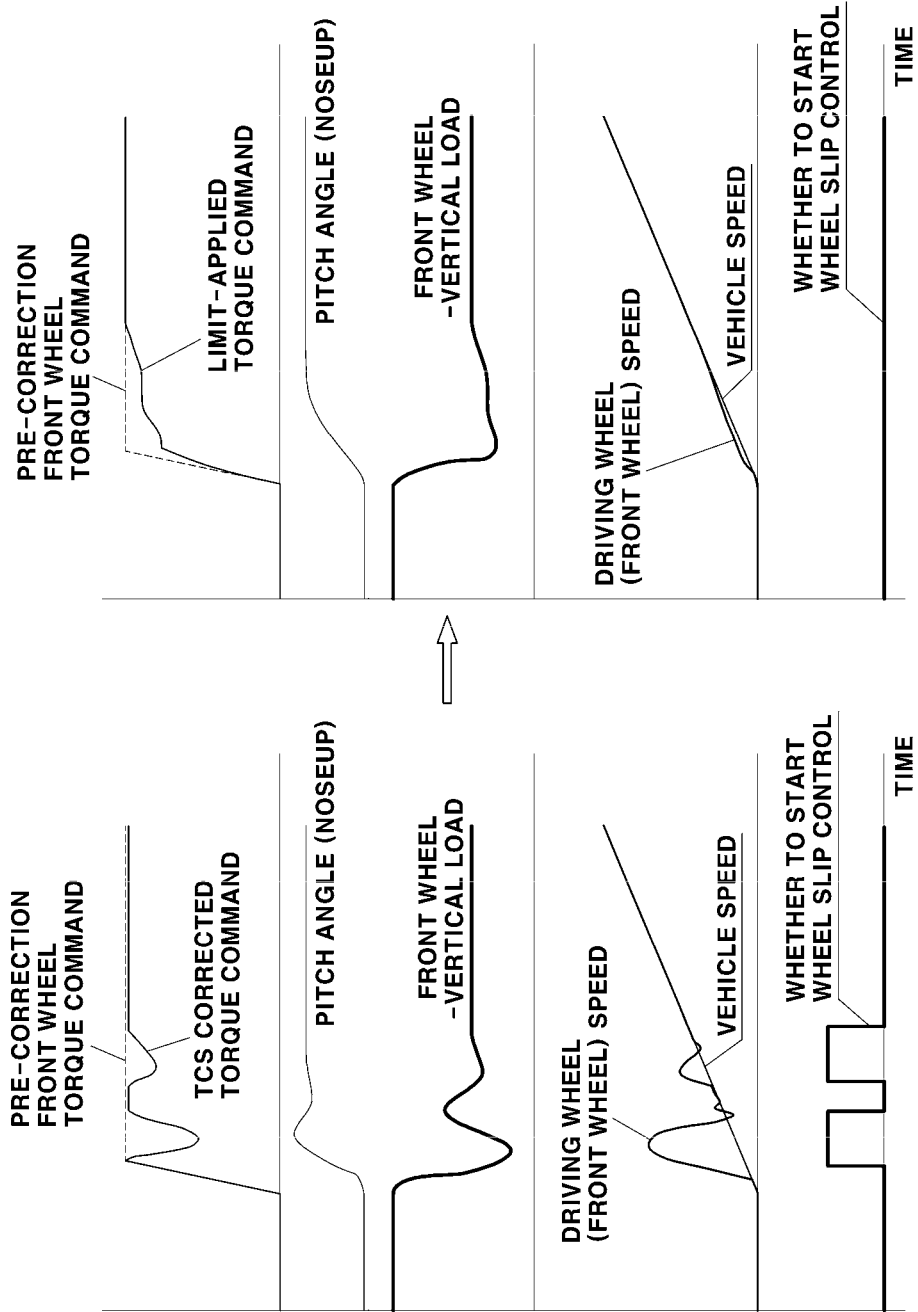
FIG. 7 and FIG. 8 are diagrams for comparing wheel slip control of the related art and a driving force control state of the present disclosure with each other.
Figure 8:
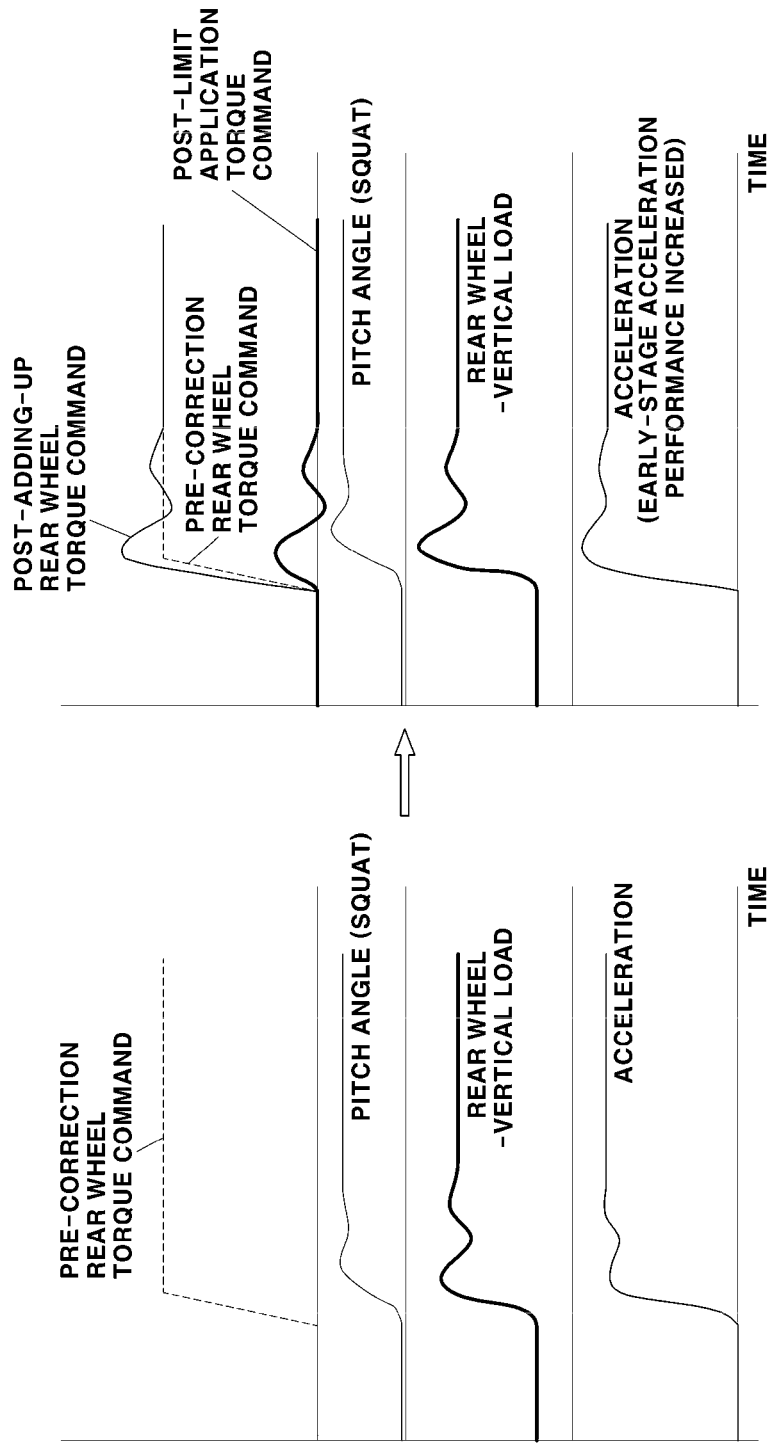

FIG. 7 and FIG. 8 are diagrams for comparing wheel slip control of the related art and a driving force control state of the present disclosure with each other, and show a driving force control state for front wheels and a driving force control state for rear wheels, respectively.

'Invention' in FIG. 7 shows a driving force control state in an exemplary embodiment that utilizes a map simulating a natural frequency removal filter, and 'invention' in FIG. 8 shows a driving force control state in an exemplary embodiment that utilizes a map simulating a natural frequency pass filter.

In FIG. 7, 'post-correction front wheel torque command' shows a front wheel torque (front wheel driving torque or front wheel driving force) command distributed in accordance with a power distribution ratio from a required torque (required driving torque or required driving force) command. In FIG. 7, pitch angle information, a front wheel vertical load, a driving wheel (front wheel) speed, a vehicle speed, a post-correction front wheel torque (driving torque) command, and a post-limit application torque (driving torque) command in squat (or noseup) of a vehicle are exemplified as real-time variation information, and whether to start wheel slip control, etc. are shown.

According to the method of controlling the related art, applying a driving torque command causes squat (noseup) of a vehicle, whereby the front wheel-vertical load decreases. However, the vertical load does not simply decrease and may decrease while repeatedly decreasing and increasing due to kinematical characteristics of a vehicle.

Accordingly, a slip in which a wheel speed instantaneously increases is generated at the driving wheels (front wheels), but the wheel speed is converted while wheel slip control is performed when a slit is generated, so a slip, wheel slip control, and conversion of a wheel speed may be repeated in the present way. As described above, according to the related art, a situation in which wheel slip control should be performed several times may be generated.

However, when the driving force control method according to an exemplary embodiment of the present disclosure is applied, it is possible to prevent wheel slip by use of a driving torque command after a limit is applied using a filter simulation map. Accordingly, wheel slip control may not be performed.

In FIG. 8, pitch angle information, a rear wheel-vertical load, acceleration, a pre-correction torque command, a post-adding-up rear wheel torque command, and a post-filter application torque command in squat of a vehicle are exemplified, and whether to start wheel slip control, etc. are shown.

As may be seen from FIG. 8, in the present disclosure, because a map simulating a filter that reinforces a natural frequency component in a driving torque command is used, the vertical load at the rear wheels increases and the early-stage acceleration at the rear wheels increases, so that the early-stage acceleration performance of the vehicle may be increased.

Figure 9:
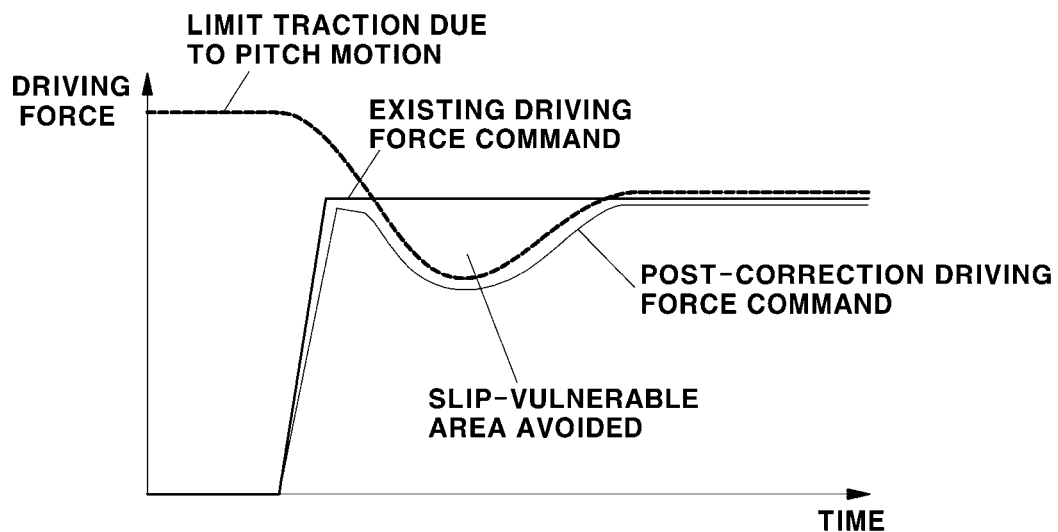
FIG. 9, FIG. 10 and FIG. 11 are diagrams for describing the effects of driving control according to an exemplary embodiment of the present disclosure.
Figure 10:
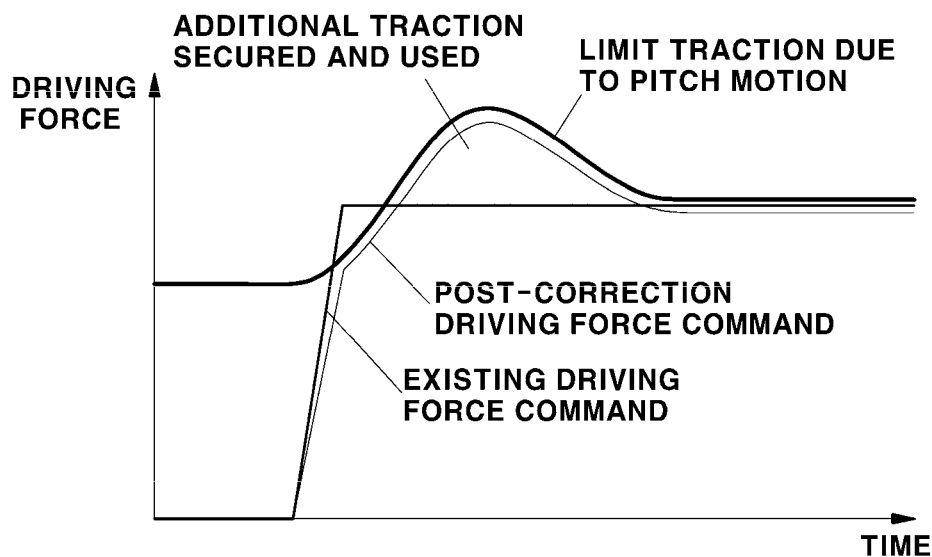
Figure 11:
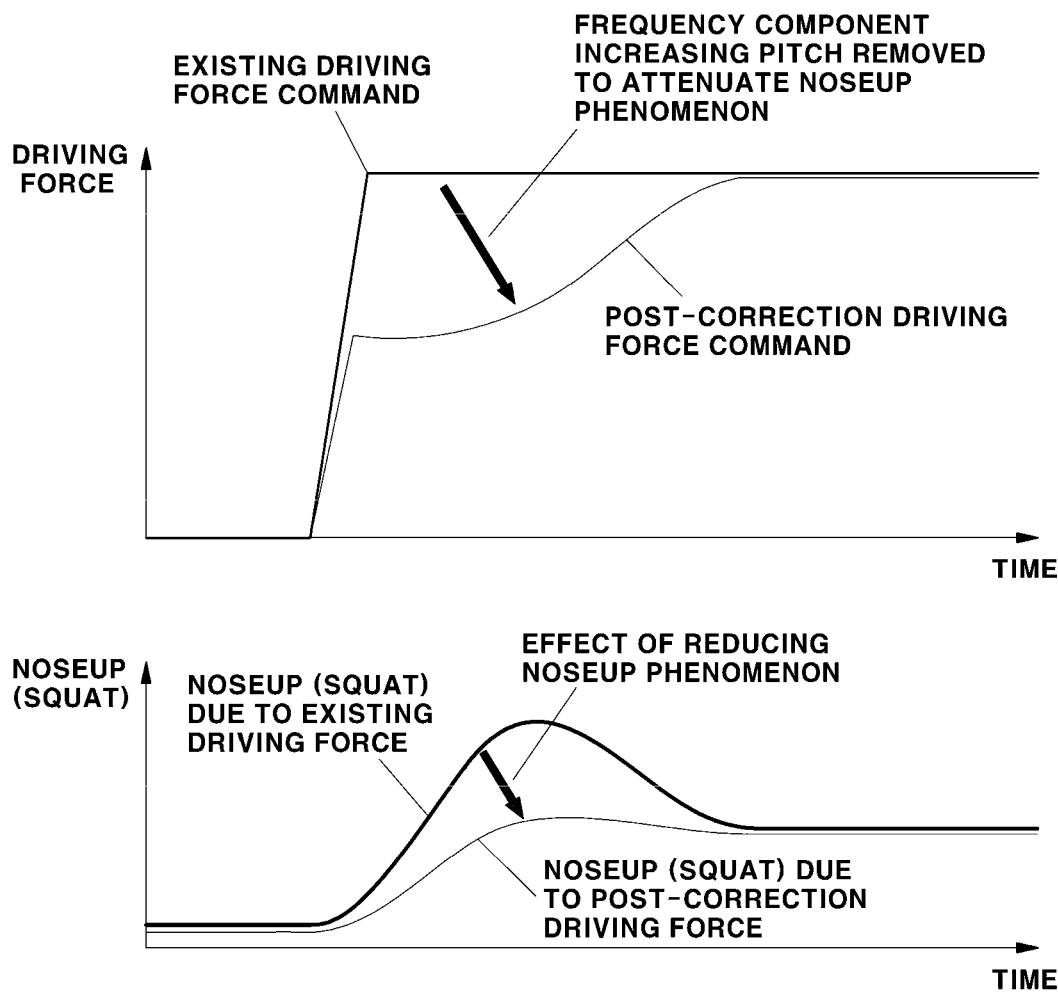

Next, FIG. 9, FIG. 10 and FIG. 11 are views for describing the effect of driving control according to an exemplary embodiment of the present disclosure. FIG. 9 is provided to describe the effect of an exemplary embodiment that utilizes a map simulating a filter that removes a natural frequency component and FIG. 10 is provided to describe the effect of an exemplary embodiment that utilizes a map simulating a filter that passes (reinforces) a natural frequency component.

First, as shown in FIG. 9, in consideration of the natural frequency characteristic of a vehicle suspension pitch motion (pitch motion), when driving force command correction using a filter simulation map that removes or decreases a corresponding natural frequency component from a driving force command and driving force control according to a driving force command after correction are performed, driving force control that can prevent or minimize wheel slip before wheel slip is generated rather than after wheel slip is generated may be achieved. Furthermore, it is possible to achieve driving force control that can avoid a wheel slip-vulnerable area in comparison to the driving force control according to a driving force command of the related art.

Furthermore, as shown in FIG. 10, in consideration of the natural frequency characteristic of a vehicle suspension pitch motion (pitch motion), when driving force command correction using a filter simulation map that reinforces a corresponding natural frequency component from a driving force command and driving force control according to a driving force command after correction are performed, it is possible to improve acceleration performance within a range, in which wheel slip is not generated, in consideration of a real-time vertical load. That is, it is possible to further secure and use traction in comparison to the driving force control according to a driving force command of the related art, so it is possible to increase the acceleration performance.

Next, as shown in FIG. 11, in consideration of the natural frequency characteristic of a vehicle suspension pitch motion, when driving force command correction using a filter simulation map that removes or decreases a corresponding natural frequency component from a driving force command and driving force control according to a driving force command after correction are performed, it is possible to attenuate an excessive suspension pitch motion of a vehicle. That is, it is possible to obtain an effect of attenuating noseup phenomenon in comparison to the driving force control according to a driving force command of the related art.

Next, FIG. 12 is a diagram showing a driving force command in an exemplary embodiment that utilizes a map that copies a natural frequency removal filter and a map that copies a natural frequency pass filter.

It was described above that a limit determined in a filter simulation map may be applied to a driving force command or a derivative value of a driving force command. In FIG. 12, the upper one shows an example in which a limit of a filter simulation map was applied to a driving force command and the lower one shows an example in which a limit of a filter simulation map was applied to a derivative value of a driving force command. Furthermore, in FIG. 12, the upper one shows an example in which a slope limit is used as the limit of the filter simulation map.

Referring to upper one in FIG. 12, a state in which a slope limit determined in a filter simulation map changes in real time in accordance with a vehicle driving variable may be seen and a driving force command (post-slope limit application command) obtained by applying the slope limit to a pre-limit application driving force command may be seen. The slope of a driving force command is limited by the slope limit that changes in accordance with a vehicle driving variable, so a driving force command of which the slope is limited in real time is obtained.

Referring to the lower one in FIG. 12, a derivative value of a pre-limit application driving force command may be seen, in which a value obtained by applying a limit (an upper limit or a slope limit) determined in a filter simulation map to a derivative value of the driving force command is shown. Referring to the lower one in FIG. 12, a post-adding-up command obtained by adding the limit-applied value to a pre-limit application command is determined as a corrected driving force command.

A driving force control method using a filter simulation map was referred to as an exemplary embodiment of the present disclosure. According to the driving force control method, it is possible to effectively prevent wheel slip by only applying a software-related method without changing the hardware or increasing the manufacturing cost of a vehicle and it is possible to increase durability of tires through prevention of wheel slip. Furthermore, it is possible to achieve an effect of improving acceleration performance of a vehicle by maximally using suspension pitch motion limit traction and an effect of improving riding comfort by attenuating a suspension pitch motion.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a driving force of a vehicle, the method comprising:
   setting and providing a filter simulation map for simulating a filter, which removes or passes a natural frequency component of a vehicle suspension pitch motion according to a suspension characteristic of the vehicle, to a control unit of the vehicle;
   determining, by the control unit, a required driving force command based on vehicle driving information collected while the vehicle is driven;
   determining, by the control unit, a final front wheel driving force command and a final rear wheel driving force command from the determined required driving force command through a limit application process of using a limit determined in accordance with a vehicle driving variable in the filter simulation map; and
   controlling, by the control unit, a driving force which is applied to front wheels and rear wheels of the vehicle by a driving device configured to drive the vehicle in accordance with the determined final front wheel driving force command and the determined final rear wheel driving force command,
   wherein the filter simulation map is a map in which a limit is set in accordance with the vehicle driving variable, and
   wherein the required driving force command or a value determined from the required driving force command is limited by the limit determined in accordance with the vehicle driving variable in the filter simulation map in the limit application process of using the limit.

2. The method of claim 1, wherein the filter simulation map is a map which is provided by determining a natural frequency of the vehicle suspension pitch motion according to a suspension characteristic of the vehicle, designing the filter that removes or passes the natural frequency component of the vehicle suspension pitch motion from a driving force command using the driving force command as input thereof, and then defining correlation between a limit for simulating the designed filter and the vehicle driving variable.

3. The method of claim 1, further including constructing a transfer function modeled to determine and output state information related to the vehicle suspension pitch motion using a variable showing a vehicle driving state as input thereof,
   wherein the natural frequency of the vehicle suspension pitch motion is determined as a natural frequency of the constructed transfer function.

4. The method of claim 1, wherein the vehicle driving variable for determining the limit in the filter simulation map is one of a value that is, as a value of a current control cycle, the required driving force command before limited by a limit, a value that is, as a value determined from the required driving force command of the current control cycle, a value before limited by a limit, a value that is, as a value of an immediately previous control cycle, the required driving force command after limited by a limit, and a value that is, as a value determined from the required driving force command of the immediately previous control cycle, a value after limited by a limit.

5. The method of claim 1, wherein the limit determined in accordance with the vehicle driving variable in the filter simulation map is applied to the required driving force command, a derivative value of the required driving force command, a front wheel driving force command distributed from the required driving force command, a rear wheel driving force command distributed from the required driving force command, a derivate value of the front wheel driving force command distributed from the required driving force command, and a derivate value of the rear wheel driving force command distributed from the required driving force command, and
   as the limit of the filter simulation map is applied, the natural frequency component of the vehicle suspension pitch motion is removed or passed from the required driving force command, the front wheel driving force command, or the rear wheel driving force command.

6. The method of claim 1, wherein the filter is one selected from
- a low pass filter which is a filter configured to remove the natural frequency component and has a cut-off frequency corresponding to the natural frequency of the vehicle suspension motion and a notch filter which is a filter configured to remove the natural frequency component and has a center frequency corresponding to the natural frequency of the vehicle suspension motion, and
- a high pass filter which is a filter configured to pass the natural frequency component and has the cut-off frequency corresponding to the natural frequency of the vehicle suspension motion and a notch filter which is a filter configured to pass the natural frequency component and has the center frequency corresponding to the natural frequency of the vehicle suspension motion.

7. The method of claim 1,
wherein the filter is a filter that removes a natural frequency component of a vehicle suspension motion from a driving force command and the filter simulation map is a map in which a limit for removing the natural frequency component of the vehicle suspension motion from a driving force map is set, and
wherein the determining of the final front wheel driving force command and the final rear wheel driving force command includes:
   distributing the required driving force command into a front wheel driving force command and a rear wheel driving force command;
   determining the distributed rear wheel driving force command as the final rear wheel driving force command; and
   determining a post-limit application front wheel driving force command as the final front wheel driving force command by applying the limit determined in the filter simulation map to the distributed front wheel driving force command.

8. The method of claim 1,
wherein the filter is a filter that removes a natural frequency component of a vehicle suspension motion from a driving force command and the filter simulation map is a map in which a limit for removing the natural frequency component of the vehicle suspension motion from a driving force map is set, and
wherein the determining of the final front wheel driving force command and the final rear wheel driving force command includes:
   distributing the required driving force command into a front wheel driving force command and a rear wheel driving force command;
   determining a post-limit application front wheel driving force command as the final front wheel driving force command by applying the limit determined in the filter simulation map to the distributed front wheel driving force command;
   determining a difference between the distributed front wheel driving force command and the post-limit application front wheel driving force command; and
   performing correction of compensating for the distributed rear wheel driving force command by the determined difference between commands, and determining the corrected rear wheel driving force command as the final rear wheel driving force command.

9. The method of claim 1,
wherein the filter is a filter that removes a natural frequency component of a vehicle suspension motion from a driving force command and the filter simulation map is a map in which a limit for removing the natural frequency component of the vehicle suspension motion from a driving force map is set, and
wherein the determining of the final front wheel driving force command and the final rear wheel driving force command includes:
   determining a post-limit application required driving force command by applying the limit determined in the filter simulation map to the required driving force command; and
   distributing the post-limit application required driving force command into a front wheel driving force command and a rear wheel driving force command, and determining the distributed front wheel driving force command and the distributed rear wheel driving force command as the final front wheel driving force command and the final rear wheel driving force command, respectively.

10. The method of claim 1,
wherein the filter is a filter that removes a natural frequency component of a vehicle suspension motion from a driving force command and the filter simulation map is a map in which a limit for removing the natural frequency component of the vehicle suspension motion from a driving force map is set, and
wherein the determining of the final front wheel driving force command and the final rear wheel driving force command includes:
   determining a post-limit application required driving force command by applying the limit determined in the filter simulation map to the required driving force command;
   distributing the post-limit application required driving force command into a front wheel driving force command and a rear wheel driving force command;
   determining the distributed from wheel driving force command as the final front wheel driving force command;
   determining a difference between the required driving force command before the limit is applied and the post-limit application required driving force command; and
   performing correction of compensating for the distributed rear wheel driving force command by the determined difference between commands, and determining the corrected rear wheel driving force command as the final rear wheel driving force command.

11. The method of claim 1,
wherein the filter is a filter that removes a natural frequency component of a vehicle suspension motion from a driving force command and the filter simulation map is a map in which a limit for removing the natural frequency component of the vehicle suspension motion from a driving force map is set, and
wherein the determining of the final front wheel driving force command and the final rear wheel driving force command includes:
   distributing the required driving force command into a front wheel driving force command and a rear wheel driving force command;

determining a post-limit application required driving force command by applying the limit determined in the filter simulation map to the required driving force command;

distributing the post-limit application required driving force command into a front wheel driving force command and a rear wheel driving force command; and determining the front wheel driving force command distributed from the post-limit application required driving force command and the rear wheel driving force command distributed from the required driving force command before the limit is applied as the final front wheel driving force command and the final rear wheel driving force command, respectively.

12. The method of claim 1, wherein the filter is a filter that removes a natural frequency component of a vehicle suspension motion from a driving force command and the filter simulation map is a map in which a limit for removing the natural frequency component of the vehicle suspension motion from a driving force map is set, and wherein the determining of the final front wheel driving force command and the final rear wheel driving force command includes:

distributing the required driving force command into a front wheel driving force command and a rear wheel driving force command;

determining a post-limit application required driving force command by applying the limit determined in the filter simulation map to the required driving force command;

determining a difference between the required driving force command before the limit is applied and the post-limit application required driving force command; and performing correction for compensating for the distributed front wheel driving force command and the distributed rear wheel driving force command by the determined difference between commands, and determining the final front wheel driving force command and the final rear wheel driving force command from the corrected front wheel driving force command and the corrected rear wheel driving force command, respectively.

13. The method of claim 1, wherein the filter is a filter that passes a natural frequency component of a vehicle suspension motion from a driving force command and the filter simulation map is a map in which a limit for passing the natural frequency component of the vehicle suspension motion from a driving force map is set, and wherein the determining of the final front wheel driving force command and the final rear wheel driving force command includes:

distributing the required driving force command into a front wheel driving force command and a rear wheel driving force command, and determining the distributed rear wheel driving force command as the final rear wheel driving force command;

determining a post-limit application front wheel driving force command or a post-limit application derivative value by applying the limit determined in the filter simulation map to a predetermined one of the distributed front wheel driving force command and a derivative value of the distributed front wheel driving force command; and determining a post-subtraction front wheel driving force command as the final front wheel driving force command by subtracting the post-limit application front wheel driving force command or the post-limit application derivative value from the front wheel driving force command distributed from the required driving force command.

14. The method of claim 1, wherein the filter is a filter that passes a natural frequency component of a vehicle suspension motion from a driving force command and the filter simulation map is a map in which a limit for passing the natural frequency component of the vehicle suspension motion from a driving force map is set, and wherein the determining of the final front wheel driving force command and the final rear wheel driving force command includes:

distributing the required driving force command into a front wheel driving force command and a rear wheel driving force command;

determining a post-limit application front wheel driving force command or a post-limit application derivative value by applying the limit determined in the filter simulation map to a predetermined one of the distributed front wheel driving force command and a derivative value of the distributed front wheel driving force command;

determining a post-adding-up rear wheel driving force command as the final rear wheel driving force command by adding the post-limit application front wheel driving force command or the post-limit application derivative value to the rear wheel driving force command distributed from the required driving force command; and determining a post-limit application front wheel driving force command as the final front wheel driving force command by applying the limit determined in the filter simulation map to the distributed front wheel driving force command.

15. The method of claim 1, wherein the filter is a filter that passes a natural frequency component of a vehicle suspension motion from a driving force command and the filter simulation map is a map in which a limit for passing the natural frequency component of the vehicle suspension motion from a driving force map is set, and wherein the determining of the final front wheel driving force command and the final rear wheel driving force command includes:

distributing the required driving force command into a front wheel driving force command and a rear wheel driving force command;

determining a post-limit application rear wheel driving force command or a post-limit application derivative value by applying the limit determined in the filter simulation map to a predetermined one of the distributed rear wheel driving force command and a derivative value of the distributed rear wheel driving force command;

determining a post-subtraction front wheel driving force command as the final front wheel driving force command by subtracting the post-limit application rear wheel driving force command or the post-limit application derivative value from the rear wheel driving force command distributed from the required driving force command; and determining a post-limit application rear wheel driving force command as the final rear wheel driving force command by applying the limit determined in the filter simulation map to the distributed rear wheel driving force command.

16. The method of claim 1,
wherein the filter is a filter that passes a natural frequency component of a vehicle suspension motion from a driving force command and the filter simulation map is a map in which a limit for passing the natural frequency component of the vehicle suspension motion from a driving force map is set, and
wherein the determining of the final front wheel driving force command and the final rear wheel driving force command includes:
  distributing the required driving force command into a front wheel driving force command and a rear wheel driving force command, and determining the distributed front wheel driving force command as the final front wheel driving force command;
  determining a post-limit application rear wheel driving force command or a post-limit application derivative value by applying the limit determined in the filter simulation map to a predetermined one of the distributed rear wheel driving force command and a derivative value of the distributed rear wheel driving force command; and
  determining a post-adding-up rear wheel driving force command as the final rear wheel driving force command by adding the post-limit application rear wheel driving force command or the post-limit application derivative value to the rear wheel driving force command distributed from the required driving force command.

17. The method of claim 1,
wherein the filter is a filter that passes a natural frequency component of a vehicle suspension motion from a driving force command and the filter simulation map is a map in which a limit for passing the natural frequency component of the vehicle suspension motion from a driving force map is set, and
wherein the determining of the final front wheel driving force command and the final rear wheel driving force command includes:
  distributing the required driving force command into a front wheel driving force command and a rear wheel driving force command;
  determining a post-limit application required driving force command or a post-limit application derivative value by applying the limit determined in the filter simulation map to a predetermined one of the required driving force command and a derivative value of the required driving force command; and
  performing correction for compensating for the distributed front wheel driving force command and the distributed rear wheel driving force command by the post-limit application required driving force command or the post-limit application derivative value, and determining the corrected front wheel driving force command and the corrected rear wheel driving force command as the final front wheel driving force command and the final rear wheel driving force command, respectively.

18. The method of claim 1,
wherein the filter is a filter that passes a natural frequency component of a vehicle suspension motion from a driving force command and the filter simulation map is a map in which a limit for passing the natural frequency component of the vehicle suspension motion from a driving force map is set, and
wherein the determining of the final front wheel driving force command and the final rear wheel driving force command includes:
  distributing the required driving force command into a front wheel driving force command and a rear wheel driving force command;
  determining a post-limit application required driving force command or a post-limit application derivative value by applying the filter to a predetermined one of the required driving force command and a derivative value of the required driving force command;
  distributing the post-limit application required driving force command or the post-limit application derivative value into a front wheel distribution component and a rear wheel distribution component;
  determining a post-subtraction front wheel driving force command as the final front wheel driving force command by subtracting the front wheel distribution component from the distributed front wheel driving force command; and
  determining a post-adding-up rear wheel driving force command as the final rear wheel driving force command by adding the rear wheel distribution component to the distributed rear wheel driving force command.

19. The method of claim 1, wherein, in the determining of the final front wheel driving force command and the final rear wheel driving force command, the control unit is configured to:
  determine whether to apply the limit based on the vehicle driving information, and
  determine a front wheel driving force command and a rear wheel driving force command, which are obtained by distributing the required driving force command in accordance with a power distribution ratio, as the final front wheel driving force command and the final rear wheel driving force command without the limit application process that utilizes the limit when non-application of the limit is determined from the vehicle driving information.

20. The method of claim 1, wherein the determining of the final front wheel driving force command and the final rear wheel driving force command includes:
  determining a weight corresponding to a current vehicle driving state from the vehicle driving information using a state variable map;
  determining a front wheel driving force command and a rear wheel driving force command by distributing the required driving force command in accordance with a power distribution ratio;
  adding up values obtained by applying the determined weight to the front wheel driving force command distributed and determined without the limit application process and the front wheel driving force command obtained through the limit application process after distribution;
  adding up values obtained by applying the determined weight to the rear wheel driving force command distributed and determined without the limit application process and the rear wheel driving force command obtained through the limit application process after distribution; and
  determining the front wheel driving force command and the rear wheel driving force command obtained through adding-up after the weight is applied as the final front wheel driving force command and the final rear wheel driving force command.

\* \* \* \* \*